(12) United States Patent
Suzuki et al.

(10) Patent No.: US 9,256,525 B2
(45) Date of Patent: Feb. 9, 2016

(54) SEMICONDUCTOR MEMORY DEVICE INCLUDING A FLAG FOR SELECTIVELY CONTROLLING ERASING AND WRITING OF CONFIDENTIAL INFORMATION AREA

(71) Applicants: Toshihiro Suzuki, Tokyo (JP); Noboru Shibata, Kawasaki (JP); Takahiro Shimizu, Yokohama (JP)

(72) Inventors: Toshihiro Suzuki, Tokyo (JP); Noboru Shibata, Kawasaki (JP); Takahiro Shimizu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 189 days.

(21) Appl. No.: 13/690,961

(22) Filed: Nov. 30, 2012

(65) Prior Publication Data

US 2013/0145083 A1    Jun. 6, 2013

Related U.S. Application Data

(63) Continuation-in-part of application No. 13/602,721, filed on Sep. 4, 2012, now abandoned.

(30) Foreign Application Priority Data

Dec. 2, 2011   (JP) ................................ 2011-264736
Oct. 30, 2012  (JP) ................................ 2012-238851

(51) Int. Cl.
*G06F 12/02*   (2006.01)
*G06F 12/14*   (2006.01)
*G06F 21/79*   (2013.01)

(52) U.S. Cl.
CPC ........ *G06F 12/0246* (2013.01); *G06F 12/1433* (2013.01); *G06F 21/79* (2013.01)

(58) Field of Classification Search
CPC ................ G06F 12/0246; G06F 12/14; G06F 2212/1052; G11C 16/02; G11C 16/22
See application file for complete search history.

(56) References Cited

U.S. PATENT DOCUMENTS 6,462,985 B2   10/2002  Hosono et al. ........... 365/185.09
7,376,010 B2 *  5/2008  Tanaka et al. ............ 365/185.04

(Continued)

FOREIGN PATENT DOCUMENTS

| JP | 2001-109666 A | 4/2001 |
|----|---------------|--------|
| JP | 2001-176290   | 6/2001 |
| JP | 2003-123489 A | 4/2003 |
| JP | 2005-149715 A | 6/2005 |
| JP | 4991971 B1    | 8/2012 |

OTHER PUBLICATIONS

First Office Action (translation) in Patent Application No. 2012-238851, mailing date Nov. 4, 2015, 3 pages.*

(Continued)

*Primary Examiner* — Sanjiv Shah
*Assistant Examiner* — Glenn Gossage
(74) *Attorney, Agent, or Firm* — Oblon, McClelland, Maier & Neustadt, L.L.P.

(57) ABSTRACT

A semiconductor memory device includes a memory which comprises a confidential information area storing confidential information and a flag. A controller reads the flag from the memory when instructed to erase or write data in the confidential information area, determines whether the flag is set, erases or writes data in the confidential information area when the flag is clear, and abandons a process requested by an erase or write instruction when the flag is set. An authenticator uses data in the confidential information area to execute an operation for authentication. A management information area may store management information for associated pages. The flag may include a bit string and a complementary bit string to improve reliability of the flag. The confidential information area may store dummy data when the memory is used for uses other than an application with an authentication function, so no problem arises using a normal controller.

19 Claims, 22 Drawing Sheets

(56) References Cited

U.S. PATENT DOCUMENTS

| | | | |
|---|---|---|---|
| 2007/0234142 A1* | 10/2007 | Aizawa | 714/718 |
| 2009/0055562 A1* | 2/2009 | Ito | 710/105 |
| 2009/0205053 A1* | 8/2009 | Sriram et al. | 726/30 |
| 2010/0138623 A1* | 6/2010 | De Santis et al. | 711/163 |
| 2013/0142324 A1 | 6/2013 | Nagai et al. | |
| 2013/0145162 A1 | 6/2013 | Nagai et al. | |

OTHER PUBLICATIONS

Office Action issued Mar. 12, 2015 in Taiwanese Patent Application No. 101144583 (with English translation).

Office Action issued Nov. 4, 2015 in Japanese Patent Application No. 2012-238851 (with English language translation).

* cited by examiner

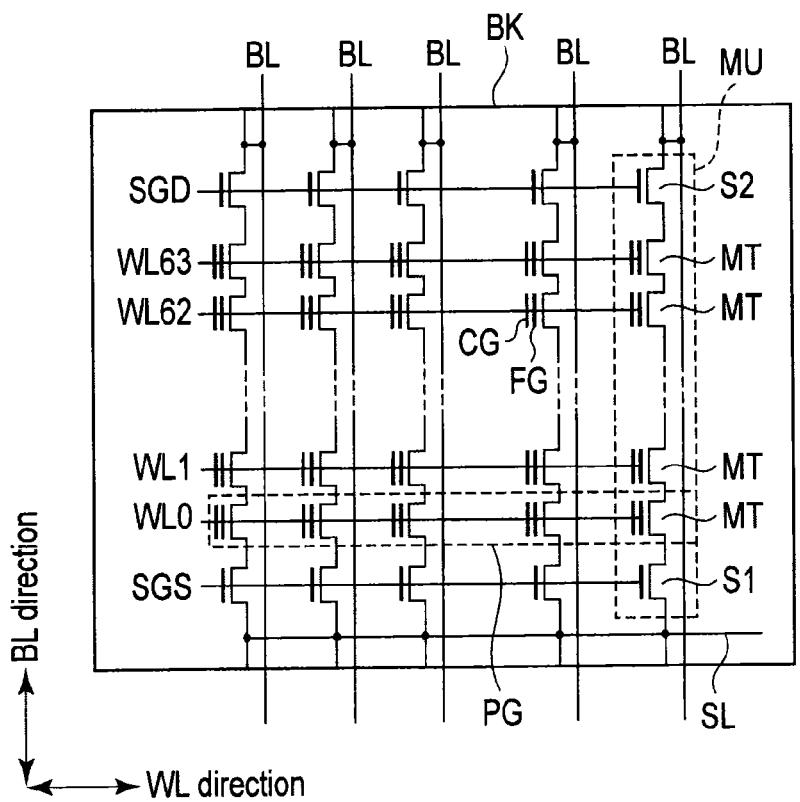
F I G. 2
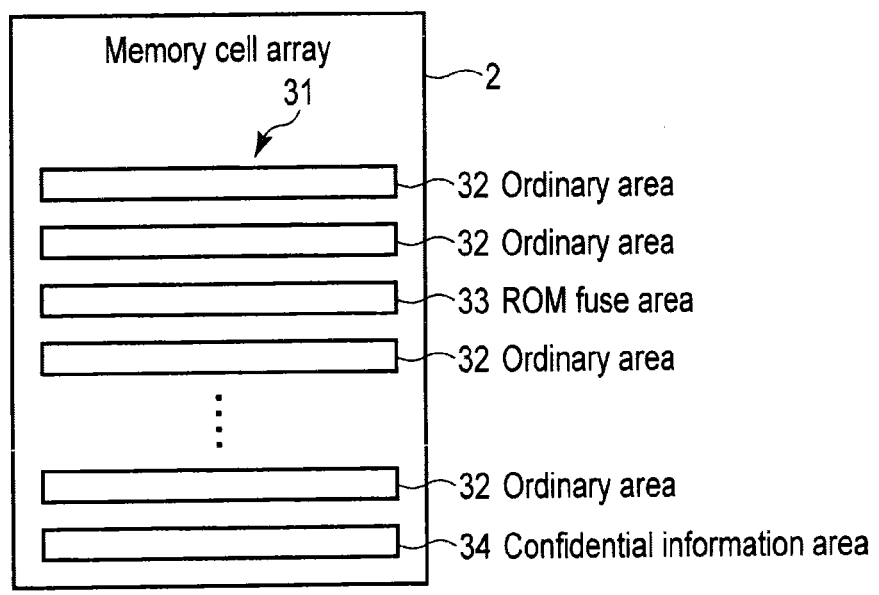
F I G. 3

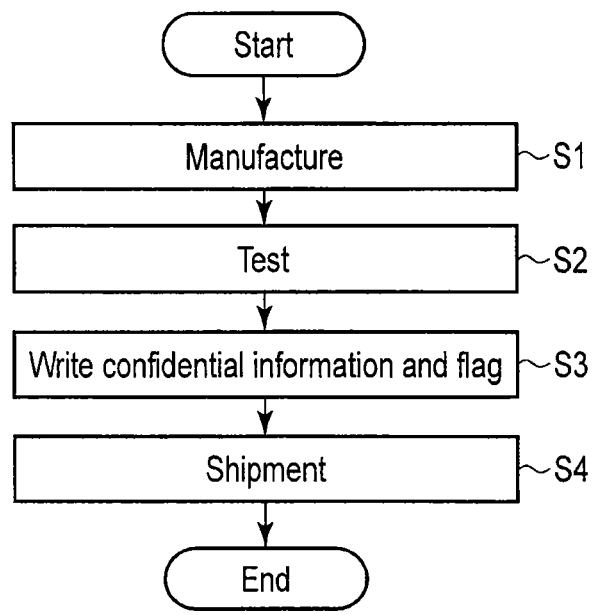
F I G. 6
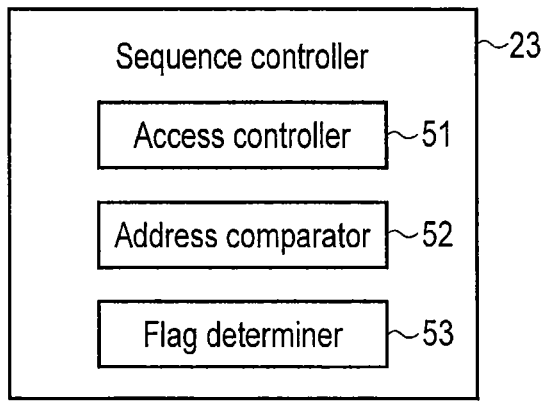
F I G. 7

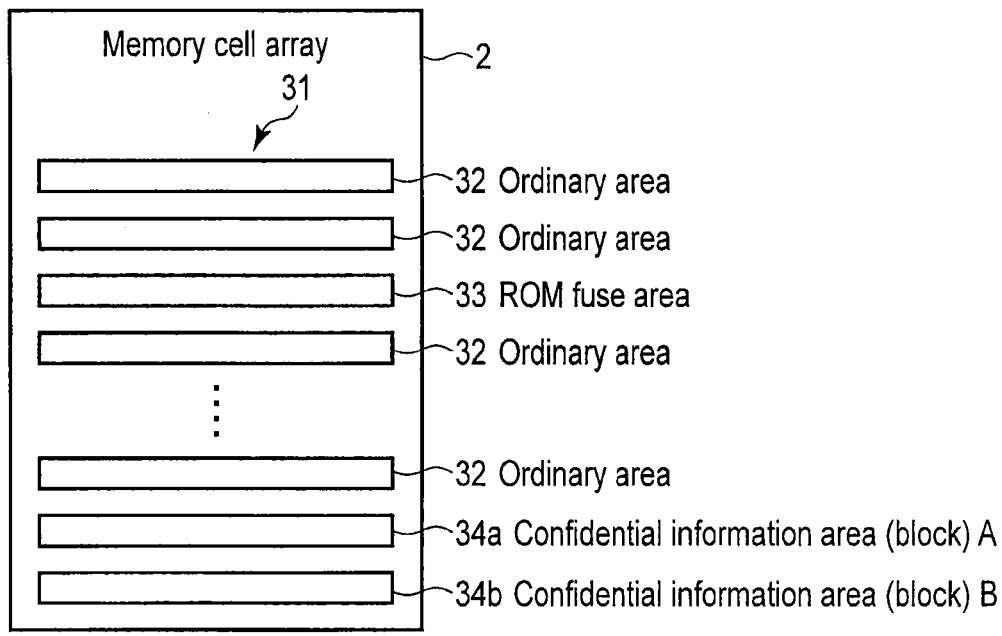
F I G. 1 2
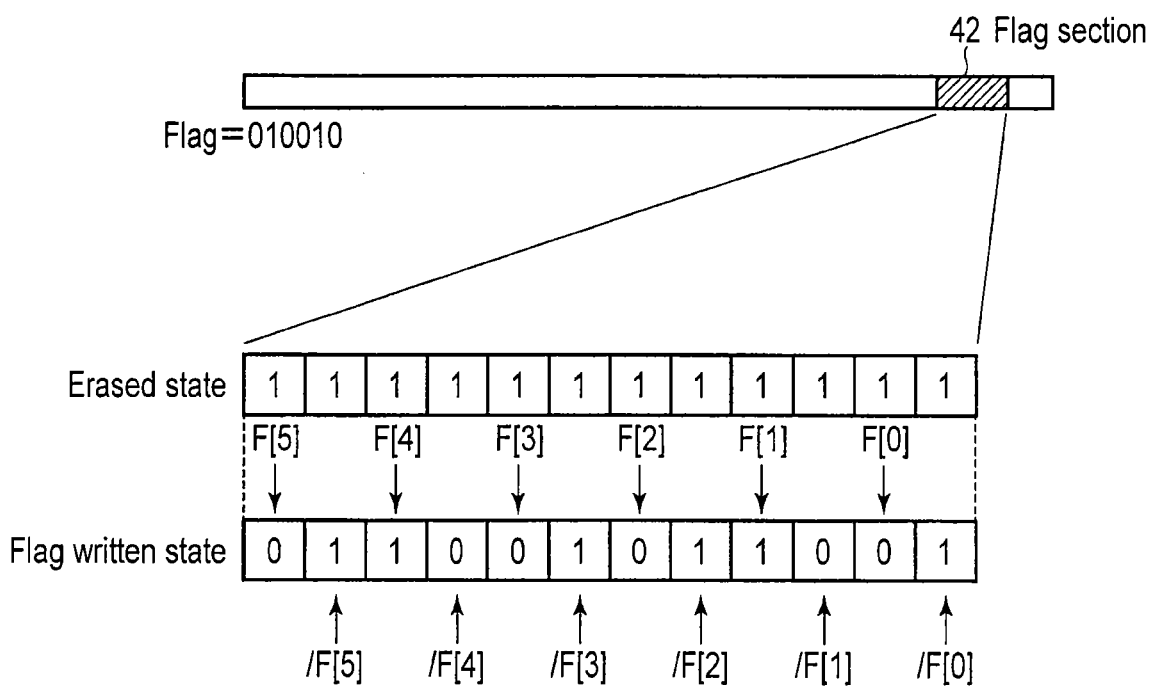
F I G. 1 3

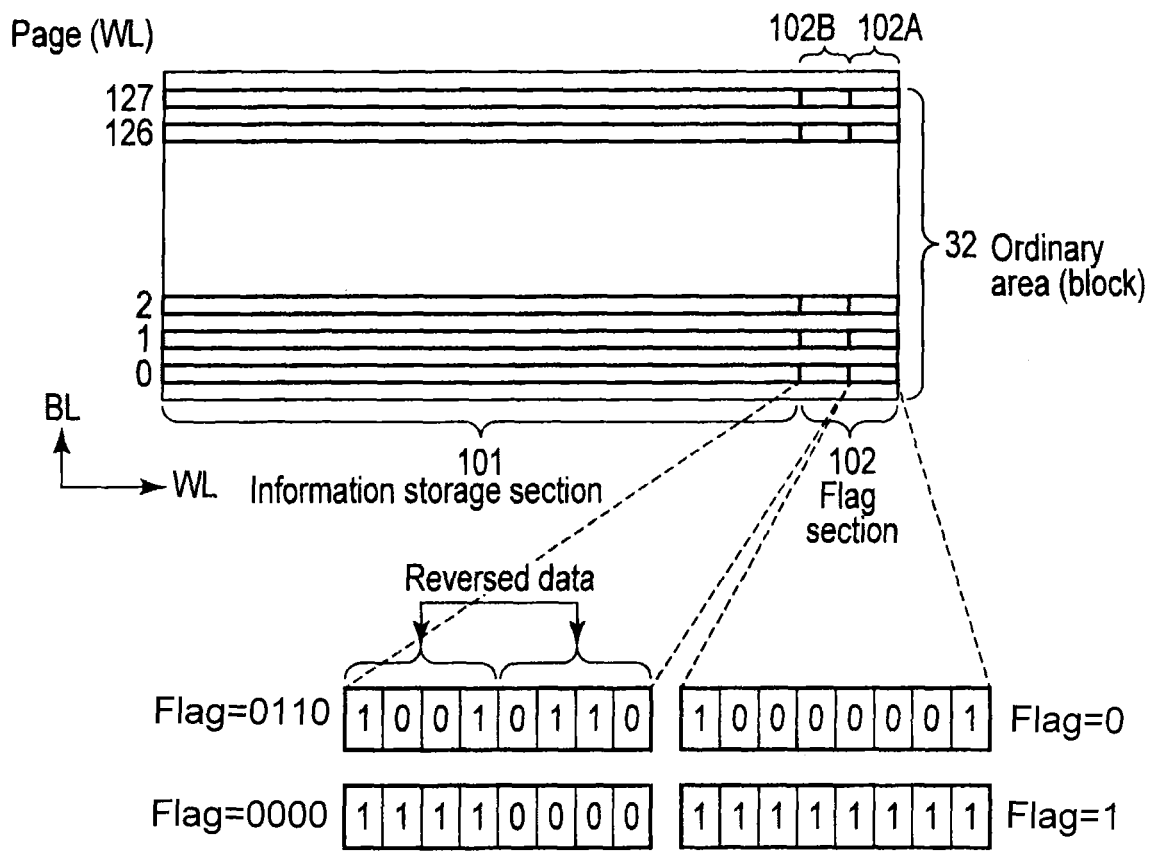
F I G. 26

SEMICONDUCTOR MEMORY DEVICE INCLUDING A FLAG FOR SELECTIVELY CONTROLLING ERASING AND WRITING OF CONFIDENTIAL INFORMATION AREA

CROSS-REFERENCE TO RELATED APPLICATIONS

This application is a Continuation-in-Part Application of U.S. patent application Ser. No. 13/602,721, filed Sep. 4, 2012, now abandoned, and is based upon and claims the benefit of priority from Japanese Patent Applications No. 2011-264736, filed Dec. 2, 2011; and No. 2012-238851, filed Oct. 30, 2012, the entire contents of all of which are incorporated herein by reference.

FIELD

Embodiments described herein relate generally to a semiconductor memory device.

BACKGROUND

Storing content, such as video, in media which incorporates a NAND flash memory has been widely practiced in recent years. In order to protect the content rights, functionalities to authenticate such media by host devices, such as video players, have been developed. For example, the host devices determine whether the media is an authorized or unauthorized copy and refuses to play the video if the media is the latter. Data required for authentication, such as a secret key, is written to a specific area in the NAND flash memory before shipment. If such data in the specific area can be rewritten by any user, an attacker can erase the area and write data which can pass the authentication to duplicate unauthorized media.

BRIEF DESCRIPTION OF THE DRAWINGS

FIG. 2 illustrates a circuit diagram of an example block of the semiconductor memory device according to one embodiment.

FIG. 3 illustrates an example classification of memory space by a memory cell array according to one embodiment.

FIG. 6 illustrates an example flowchart from the manufacture to shipment of the semiconductor memory device according to one embodiment.

FIG. 7 illustrates a block diagram of a sequence controller according to one embodiment.

FIG. 12 illustrates another example classification of memory space by a memory cell array according to one embodiment.

FIG. 13 illustrates an example flag according to one embodiment.

FIG. 26 illustrates an example ordinary area.

DETAILED DESCRIPTION

Figure 1:
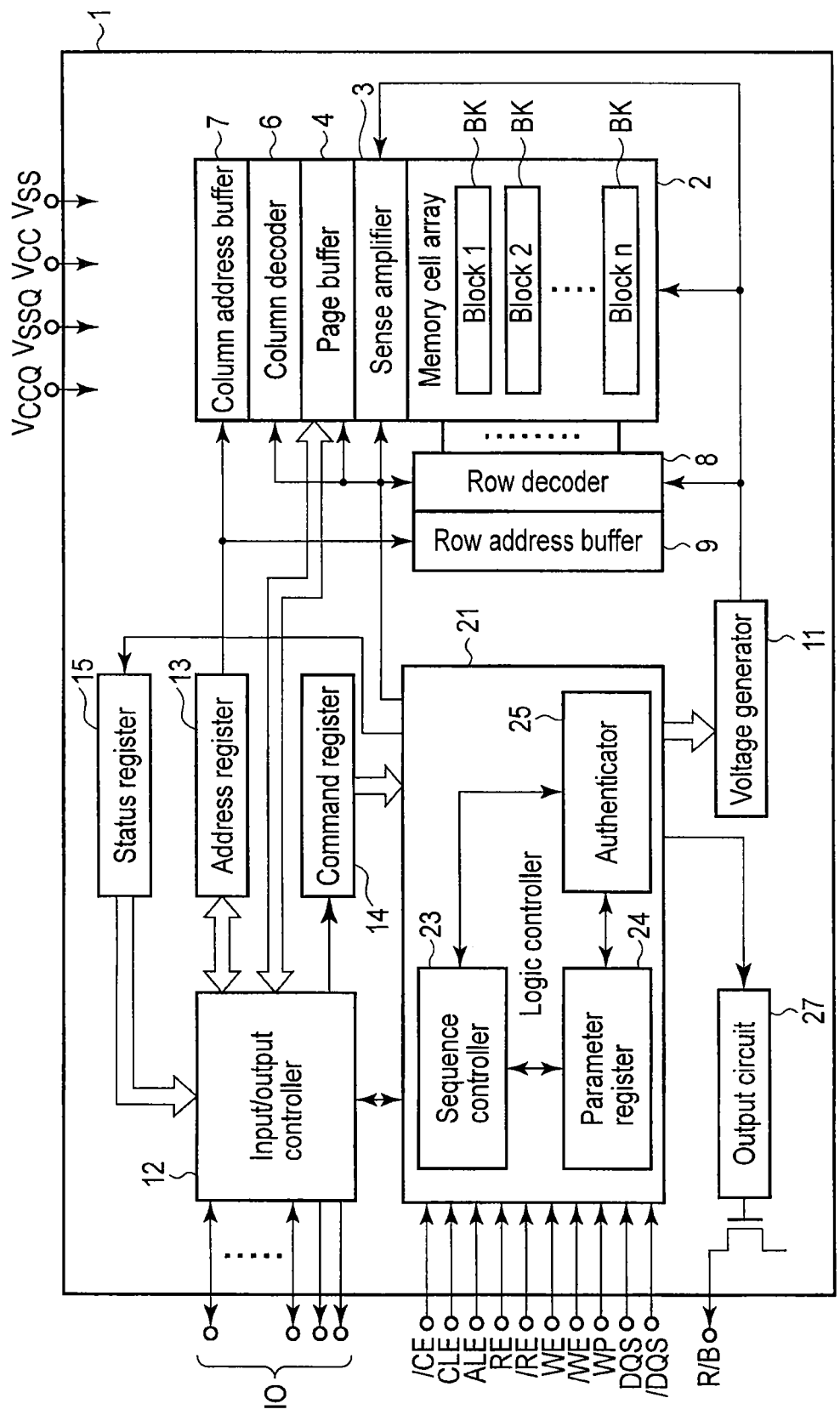
FIG. 1 illustrates a functional block diagram of a semiconductor memory device according to one embodiment.

In general, according to one embodiment, a semiconductor memory device includes a memory which comprises an area accessible from outside and a confidential information area storing confidential information and a set flag. A controller reads the flag from the memory when instructed to erase data in the confidential information area, determines whether the flag is set, erases data in the confidential information area when the flag is clear, and abandons a process requested by the data erase instruction when the flag is set. An authenticator uses data in the confidential information area to execute operation for authentication.

The inventors have obtained the following knowledge in the course of development of embodiments. Only erasure of the confidential information needs to be prohibited in order to prevent rewriting of the confidential information in the NAND flash memories because the NAND flash memories prohibit overwriting written information because of their properties. In other words, writing is allowed only to memory cells with threshold voltages of the erased state.

As described above, rewriting to the area which stores confidential information needs to be prevented. On the other hand, the confidential information needs to be written in the area, and the memories need to go through a test for writing and erasing data before the confidential information is written. Therefore, it is necessary to allow for writing and erasing data in the confidential area during the test before the confidential information is written and confidential information write step and to prevent erasing (and therefore also writing) of data in the area once the confidential information is written.

One of the simplest methods to implement such different restriction before and after writing of the confidential information may be to provide read only memory (ROM) fuse parameters which have different values before and after writing confidential information. The ROM fuse parameters define various setups of the memories. A special block for storing the ROM fuse parameters is provided in semiconductor memory devices, and when power supply to the device starts, the ROM fuse parameters are read (power-on read) and then stored in a latch in a controller. Before the confidential information is written, the parameter for the confidential information storage area is set to the value to permit the writing and erasure of data to this area. In contrast, the parameter is set to the value to prohibit the writing and erasure of the data to the confidential information storage area once the confidential information is written. With the parameter set to the value for prohibition, the memories may not latch data write or erase commands, or they may latch ones but enter the data write or erase sequence and immediately after this leave the sequence without executing actual operation.

However, the ROM fuse parameters can be rewritten even after the memories are shipped from a factory. With the dedicated rewrite command and address of the parameters input from outside, one can access the area storing the parameters to rewrite the values and also read them outside. This functionality is originally prepared for a test mode, and it is partly disclosed also to users in recent years. Therefore, if an attacker attempts to access the ROM fuse parameters and to rewrite their values (for example, to reverse the values of all parameters), he can release the lock against the erase on the confidential information storage area. Such a problem remains for protection of the confidential information with the ROM fuse parameters.

Embodiments configured based on such findings will now be described with reference to drawings. Components with substantially the same functions and configurations will be referred to with the same reference numbers and repetitive descriptions will be given only when required. Moreover, embodiments only illustrate devices and methods for embodying the technical idea of the embodiments, and the technical idea of the embodiments does not limit the material, form, structure, and arrangement, and the like, of components to the following examples. The technical idea of the embodiments may be variously changed in accordance with the scope of the claims.

FIG. 1 illustrates a functional block diagram of a semiconductor memory device according to one embodiment. Each functional block may be implemented as hardware, computer software, or combination of the both. In order to clearly illustrate this interchangeability of hardware and software, descriptions will be made in terms of their functionality in general. Whether such functionality is implemented as hardware or software depends upon the particular application and design constraints imposed on the overall system. Those skilled in the art may implement the functional blocks in varying ways for each particular application, but any implementation approach is included in the scope of the embodiments. Furthermore, it is not essential that the functional blocks are distinguished from one another as described below in specific examples.

For example, some of the functions may be performed by functional blocks different from those illustrated below. Moreover, the illustrated functional block may be divided into functional sub-blocks. The embodiment is not limited by the specification of the particular functional blocks.

The semiconductor memory device 1 typically includes the features of a NAND flash memory. As shown in FIG. 1, the semiconductor memory device 1 includes a memory cell array 2. The memory cell array 2 includes blocks BK. Each block BK includes components such as memory cell transistors MT, word lines WL and bit lines BL, as shown in FIG. 2. Each block BK includes pages PG each of which includes memory cell transistors MT. Each page PG includes or consists of memory cell transistors or their memory space. Data in memory cell transistors MT in a block BK is erased collectively. The data cannot be erased in units of memory cell transistors or pages. In other words, the block BK is an erase unit. Data is collectively written to or read from the memory cell transistors MT in a page PG.

Each block BK may include a memory cell set located in a line along the word line direction (or memory cell unit). A memory cell includes a memory cell transistor MT. A memory cell column MU includes a NAND string and select transistors S1 and S2 coupled to its respective ends. A NAND string includes memory cell transistors (for example, sixty four transistors) MT whose current paths (or source/drains SD) are serially coupled to each other. The other end of the current path of the select transistor S1 is coupled to the source line SL, and the other end of the current path of the select transistor S2 is coupled to a corresponding one bit line BL. A memory cell transistor is provided at intersections of bit lines BL and word lines WL. The memory cell transistors are provided on a well formed in a semiconductor substrate. The well receives predetermined voltages from a voltage generator 11 (FIG. 1). A memory cell transistor MT has a tunnel insulator on the well, a floating gate electrode on the tunnel insulator, an inter-gate insulator on the floating gate electrode, a control gate electrode on the inter-gate insulator, and source/drain areas in the surface of the well. A source/drain area, which is a current path of the memory cell transistor MT, is coupled to the source/drain area of the adjacent memory cell transistor MT. A select transistor includes a gate insulator on the semiconductor substrate, a gate electrode on the gate insulator, and source/drain areas in the surface of the well.

Each word line WL is coupled to the control gate electrodes of memory cell transistors MT belonging to the same row. Memory cell transistors MT coupled to the same word line WL configure a page PG. The semiconductor memory device 1 may be configured to store data of two bits or more at a memory cell. In such a configuration, two pages or more are assigned to a word line WL. The two pages are referred to as an upper page and a lower page, for example. An additional page may be defined. A component only referred to as a page herein refers to a set of memory cell transistors MT coupled to the same word line, or may be referred to as a physical page. In contrast, an upper page or a lower page, and the like, which are assigned to one physical page, may be referred to as a logical page.

Referring back to FIG. 1, a sense amplifier 3 reads data of the memory cells (memory cell transistors MT) in the memory cell array 2 through the bit lines BL, and senses the state of the memory cells in the memory cell array 2 through the bit lines BL. A page buffer 4 temporarily stores data read from the sense amplifier 3, or data to be supplied to the sense amplifier 3. A column decoder 6 selects a specific bit line BL and sense amplifier in accordance with address signals received via terminals IO from outside the semiconductor memory device 1. A column address buffer 7 temporarily stores the address signals, and supplies them to the column decoder 6. A row decoder 8 receives various voltages required for data reading, writing, or erasure from the voltage generator 11, and applies them to specific word lines WL in accordance with the address signals. A row address buffer 9 temporarily stores the address signals, and supplies them to the row decoder 8. The voltage generator 11 receives voltages such as the source voltage VSS and voltage VCC, and from them generates voltages for data writing, reading, and erasure, and the like.

An input/output controller 12 receives various commands which control operation of the semiconductor memory device 1 and the address signals via the terminals IO, and also receives and outputs data. The address signals output from the input/output controller 12 are latched by an address register 13. The latched address signals are supplied to the column address buffer 7 and row address buffer 9. The commands output from the input/output controller 12 are latched by a command register 14. A status register 15 stores values which define states of operation controlled by the sequence controller 23 or authenticator 25, and it is mainly used to output status information to outside the chip through the input/output controller 12 in response to requests to read the status from outside the semiconductor memory device 1.

The semiconductor memory device 1 receives various control signals to control the operation of the semiconductor memory device 1 from outside. The control signals may include a chip enable /CE, a command latch enable CLE, an address latch enable ALE, read enables RE and /RE, write enables WE and /WE, a write protect WP, and clocks DQS and /DQS. These control signals are received at associated terminals, and supplied to the logic controller 21. In accordance with the control signals, the logic controller 21 controls the input/output controller 12 to permit or prohibit the signals on the terminals IO to reach or from reaching the address register 13, command register 14, and page buffer 4 through the input/output controller 12 as commands, addresses, or data. The logic controller 21 also receives the latched commands from the command register 14.

The logic controller 21 includes a sequence controller 23, a parameter register 24, and an authenticator 25. The sequence controller 23 receives commands from the command register 14. In accordance with the received commands, the sequence controller 23 controls the sense amplifier 3 and voltage generator 11, and the like, to execute processes instructed by the commands such as data reading, writing, and erasure. The parameter register 24 stores various parameters to specify the operation of the logic controller 21. The authenticator 25 performs the process related to authentication of the semiconductor memory device 1. For example, the authenticator 25 receives commands which request authentication, executes a specific operation for the authentication using specific data in the memory cell array 2, and outputs the result outside the semiconductor memory device 1. In a course of execution of the sequence of such operation, the authenticator 25 instructs the sequence controller 23 to read or write required data, and the like. The circuit used by the authenticator 25 to read or write such data can be implemented by a circuit to control the power-on read if the semiconductor memory device is provided with such a circuit. Using the circuit to control the power-on read can prevent the entire circuit area from increasing.

The logic controller 21 also manages the output of a ready/busy signal R/B. Specifically, the logic controller 21 controls an output circuit 27 so that the semiconductor memory device 1 outputs a busy signal during a busy state. For example, the semiconductor memory device 1 is in the busy state when a signal of the low level is output on the ready/busy output terminal, and in the ready state when a high-level signal is output on the ready/busy output terminal, or vice versa.

FIG. 3 illustrates classification of memory space 31 by the memory cell array 2 according to one embodiment. As shown in FIG. 3, the memory space 31 includes ordinary areas 32, a ROM fuse area 33, and a confidential information area 34. Each of the ordinary area 32, ROM fuse area 33, and confidential information area 34 consists of a unit greater than or equal to a page. Each of the ordinary area 32, ROM fuse area 33, and confidential information area 34 may be a page or more, or a block or more. The positions of the ordinary areas 32, ROM fuse area 33, and confidential information area 34 are arbitrary, and are not limited to the example in the figure. The ordinary areas 32, ROM fuse area 33, and confidential information area 34 all have the same physical structure (features and connections), and therefore are indistinguishable from each other. In contrast, the ordinary areas 32, ROM fuse area 33, and confidential information area 34 store information of different types, and therefore have different uses. It is possible to share the same physical area for different uses such as the ROM fuse area 33 and confidential information area 34, for example, to use a part of the ROM fuse area 33 for the confidential information area 34, if such use is possible. In particular, it is possible to use a specific page or pages of the ROM fuse area 33 which consists of a block as the confidential information area 34.

The ordinary area 32 can be accessed from a device in communication with the semiconductor memory device 1. The device in communication with the semiconductor memory device 1 can write data to the ordinary areas 32, and read or erase data in the ordinary areas 32. The ROM fuse area 33 stores ROM fuse parameters for specifying various properties of the semiconductor memory device 1. Access to the ROM fuse area 33 from outside the semiconductor memory device 1 may be permitted, partly permitted, or prohibited in accordance with the function of the semiconductor memory device 1.

The confidential information area 34 stores various confidential information, which is inaccessible from a device in communication with the semiconductor memory device 1 such as a host device. Such information may include key information used for authentication between the semiconductor memory device 1 and host device, identification information, other information intended to be used only inside the semiconductor memory device 1, and information which is accessible from a device in communication with the semiconductor memory device 1 but not desired to be accessed by users. Therefore, devices outside the semiconductor memory device 1 cannot basically access the confidential information area 34. Thus, the devices outside the semiconductor memory device 1 cannot typically know the address of the confidential information area 34 through the normal use.

Figure 4:
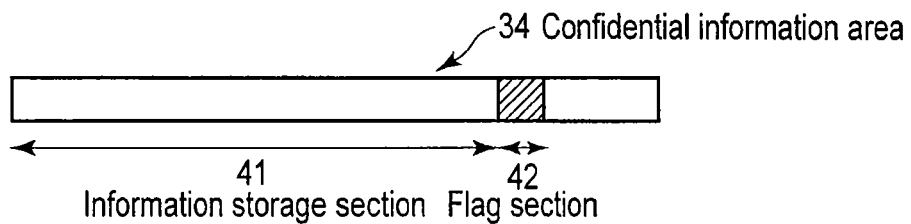
FIG. 4 illustrates structure of an example confidential information area according to one embodiment.
Figure 5:
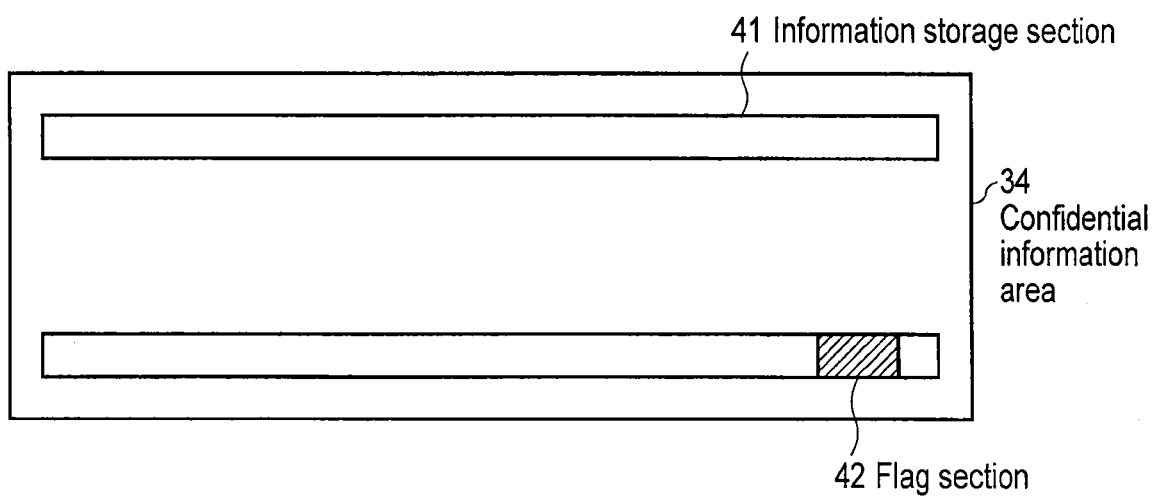
FIG. 5 illustrates another example structure of the confidential information area according to one embodiment.

The confidential information area 34 has a structure such as that shown in FIG. 4, for example. FIG. 4 illustrates the confidential information area 34 according to one embodiment. As described above, the confidential information area 34 may include a page or more, or a block or more. As shown in FIG. 4, the confidential information area 34 includes an information storage section 41 and a flag section 42. Specifically, a page or block which configures the confidential information area 34 includes memory cells to store the data stored in the information storage section 41, and memory cells to store the data stored in the flag section 42. The flag section 42 may also be provided in a page other than the page storing the confidential information. For example, as shown in FIG. 5, the flag section 42 may be defined in a page other than the page for the information storage section 41 in the confidential information area 34.

Each of the information storage section 41 and flag section 42 consists of a bit or more. When the semiconductor memory device 1 is configured to store data of two bits or more in a memory cell, one bit data may be stored per cell in the confidential information area 34, or multiple bit data may be stored per cell. However, storage of one-bit per cell may be preferred because it results in a higher data-retention reliability, which is required for the confidential information. In contrast, any number of bits per cell is possible for the ordinary areas 32 and ROM fuse area 33.

The information storage section 41 stores the confidential information. When the confidential information area 34 includes two pages or more, the flag section 42 may be provided in each of all pages, or provided only in one or more of the page. A bit or more of a specific pattern (flag) needs to be written to the flag section 42. When the specific bits are written, it is determined that the flag section 42 is set, or valid. Examples of the pattern of the flag will be described later. The position of the flag section 42 can be recognized by the sequence controller 23. To this end, the flag section 42 may be located at the end of each page or immediately after the information storage section 41 of the last one of the pages which configure the confidential information area 34, for example. The data in the flag section 42 is configured to be read to the sequence controller 23 through the page buffer 4. In other words, the sequence controller 23 recognizes the addresses of the confidential information area 34 including the flag section 42, and is configured to control associated components in the semiconductor memory device 1 to read the confidential information to the logic controller 21.

Figure 15:
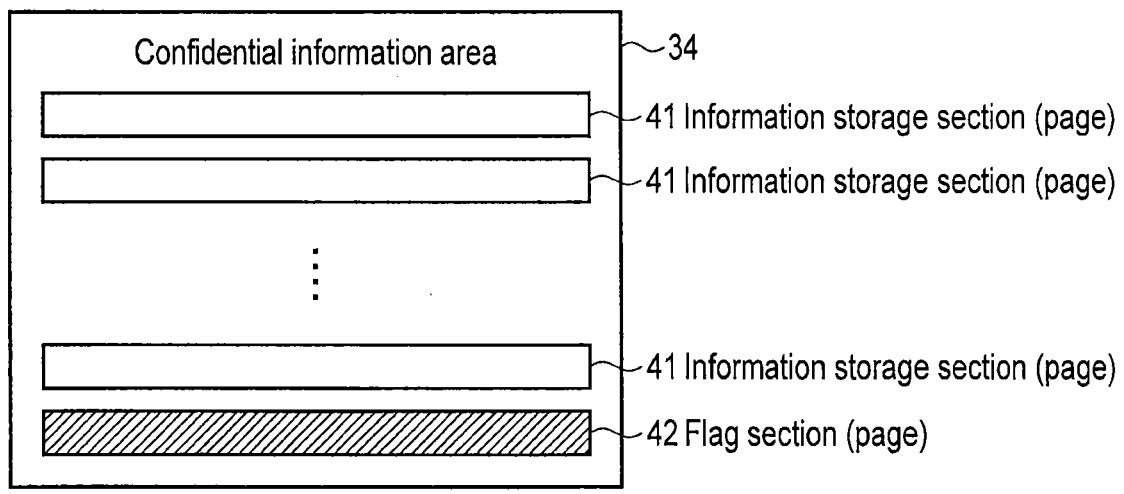
FIG. 15 illustrates another example of the structure of the confidential information area according to one embodiment.

The confidential information area 34 may also be configured as in FIG. 15. FIG. 15 illustrates another example of the confidential information area 34 according to one embodiment. As shown in FIG. 15, the information storage section 41 and flag section 42 are stored in different pages (they are assigned to different word lines because a page is assigned to a word line for a case of a cell storing one bit data). The page including the flag section 42 does not include the confidential information. The data for the flag (the flag data) is stored in some or all of the bits of the page for the flag section 42.

The authenticator 25 requires the confidential information as a part of authentication. In order to obtain the confidential information, the authenticator 25 requests the sequence controller 23 to read the confidential information.

As shown in FIG. 6, the flag is written at the same time as or after writing of the confidential information area 34, and before shipment of the semiconductor memory device 1. FIG. 6 illustrates a flowchart from the manufacture to shipment of the semiconductor memory device 1 according to one embodiment. As shown in FIG. 6, the semiconductor memory device 1 is manufactured (step S1). The semiconductor memory device 1 is then tested (step S2). The test may include a check of whether writing and erasure of data to the semiconductor memory device 1 normally occur, and sorting of a failed semiconductor memory device 1. In step S2, for a case where writing and erasing to the confidential information area 34 and following test are executed, it is necessary to determine whether the flag for the area is written, and the writing and erasing is allowed only when the flag is clear. The determination of the flag will be described later in more detail in connection with step S3. During the test, voltage trimming and writing of the parameters to the ROM fuse area 33 are also executed. The confidential information is then written to the confidential information area 34 (step S3).

Figure 16:
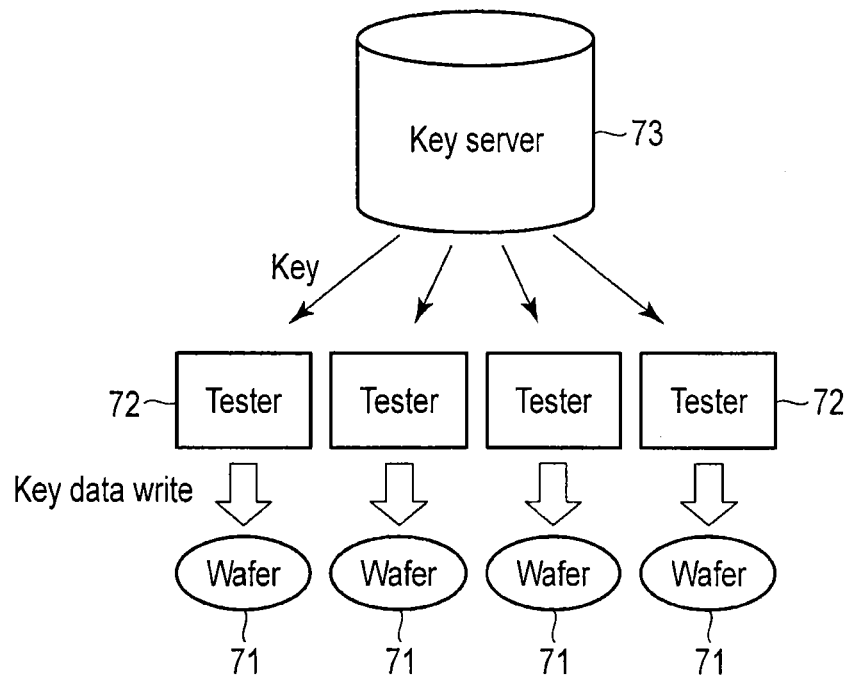
FIG. 16 illustrates writing of confidential information according to one embodiment.

The confidential information may be written using a system of FIG. 16. FIG. 16 illustrates a confidential information writing system according to one embodiment. As shown in FIG. 16, testers 72 for respective wafers 71 receive data of a key from the key (confidential information) server 73. The key data is different for the chips. The testers 72 may be communicatively coupled to the key server 73 via the internet, for example. Testers 72 write the received key data to the confidential information area 34 in the respective wafers 71.

For a case where the confidential information and flag are assigned to the same page, since the semiconductor memory device 1 is typically configured to write data in units of pages, the flag is also written to the flag section 42 in the confidential information area 34 while confidential information is written. However, such simultaneous writing has nothing to do with the essence of the disclosed embodiments, and therefore the flag can be written at any timing as long as it is written before the shipment of the semiconductor memory device 1 after the writing of the confidential information as described above.

For a case where the confidential information area 34 is configured as in FIG. 15, step S3 may be executed as follows. First, it is determined whether the flag is written. When the flag is written, step S3 ends here. In contrast, when the flag is not written, the confidential information is then written to the confidential information area 34. The flag is then written and it is determined whether the flag is correctly written. When the flag is not correctly written, the confidential information area 34 (typically the block for the confidential information area 34) is erased, and the confidential information and flag are written and then it is determined whether the flag is written. Step S3 will be described later in more detail.

The semiconductor memory device 1 is then shipped (step S4 in FIG. 6).

Figure 8:
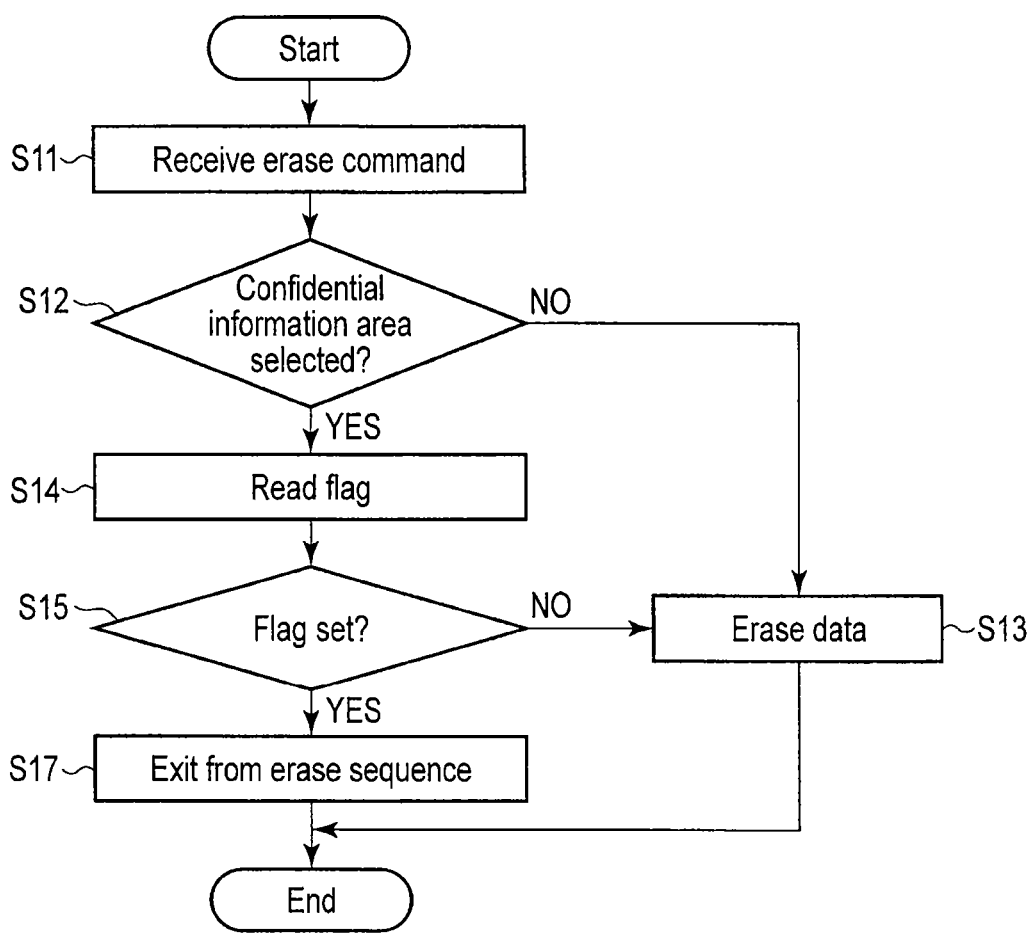
FIG. 8 illustrates an example flowchart of a data erase sequence in the semiconductor memory device according to one embodiment.

Referring now to FIGS. 7 and 8, a data erase sequence in the semiconductor memory device 1 according to one embodiment will be described. FIG. 7 illustrates a block diagram of the sequence controller 23 according to one embodiment in detail. As shown in FIG. 7, the sequence controller 23 includes an access controller 51, an address comparator 52, and a flag determiner 53. FIG. 8 illustrates a flowchart of an erase sequence in the semiconductor memory device according to one embodiment. As shown in FIG. 8, the sequence controller 23 receives an erase command (step S11). The address comparator 52 compares the address of the to-be-erased data associated with the erase command with the address of the confidential information area 34 to determine whether the confidential information area 34 is selected (step S12). The confidential information in the confidential information area 34 is intended to be used only for an authentication process within the semiconductor memory device 1 through normal use after the shipment of the semiconductor memory device 1 as described above, and is not intended to be erased. Such erasure is prohibited. Moreover, reading confidential information should be triggered by, for example, a request from the authenticator 25 as a part of the authentication, and the confidential information area 34 is not also intended to be specified directly from outside the semiconductor memory device 1, and therefore the address of the confidential information area 34 should not be disclosed. Then, the confidential information area 34 should not be the target of any data erase in the range of the usual uses after the shipment, and therefore the comparison result by the address comparator 52 indicates mismatch of the addresses. When the addresses are different, the flow shifts to step S13. In step S13, the access controller 51 controls the associated components to erase the data of the specified address (step S13). The access controller 51 serves to control the associated components in the semiconductor memory device 1 to write, read or erase data in the specified address. Following step S13, the data erase is completed.

In contrast, if the address of the confidential information area 34 is to be leaked outside through an unauthorized procedure, an attacker who obtained the address of the confidential information area 34 with some unusual unauthorized procedure may request to erase the data in the confidential information area 34 in an attempt to erase and update the confidential information. When such an instruction is received by the sequence controller 23, the determination in step S12 by the address comparator 52 results in YES. When the access controller 51 receives the result, it transfers the flag, for example to a latch in the sequence controller 23, which is not depicted (step S14).

The flag determiner 53 then determines whether the flag is set (step S15). The example of this determination will be described later. When the flag is clear, the flag determiner 53 outputs a signal indicative thereof, and the flow shifts to step S13. The situation with a clear flag typically occurs during the test process (step S2 of FIG. 6) before the writing of the confidential information. In step S13, the access controller 51 erases the data. Thus, the data erase test to the confidential information area 34 is possible.

In contrast, when the erase sequence is triggered after the shipment of the semiconductor memory device 1, the flag should be set. The address comparator 52 then outputs the flag signal. When the access controller 51 receives the signal, it exits from the sequence of erasing of the data of the specified address (step S17), or it does not erase the data of the specified address and ends the erase sequence. In other words, it abandons the process instructed by the erase command. Thus, the confidential information cannot be erased after it is written.

Figure 9:
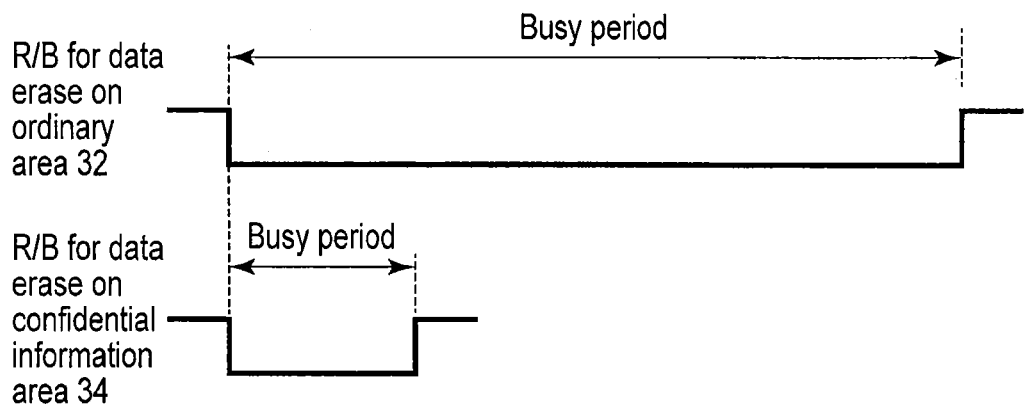
FIG. 9 illustrates examples of ready/busy status in accordance with to-be-erased areas according to one embodiment.
Figure 10:
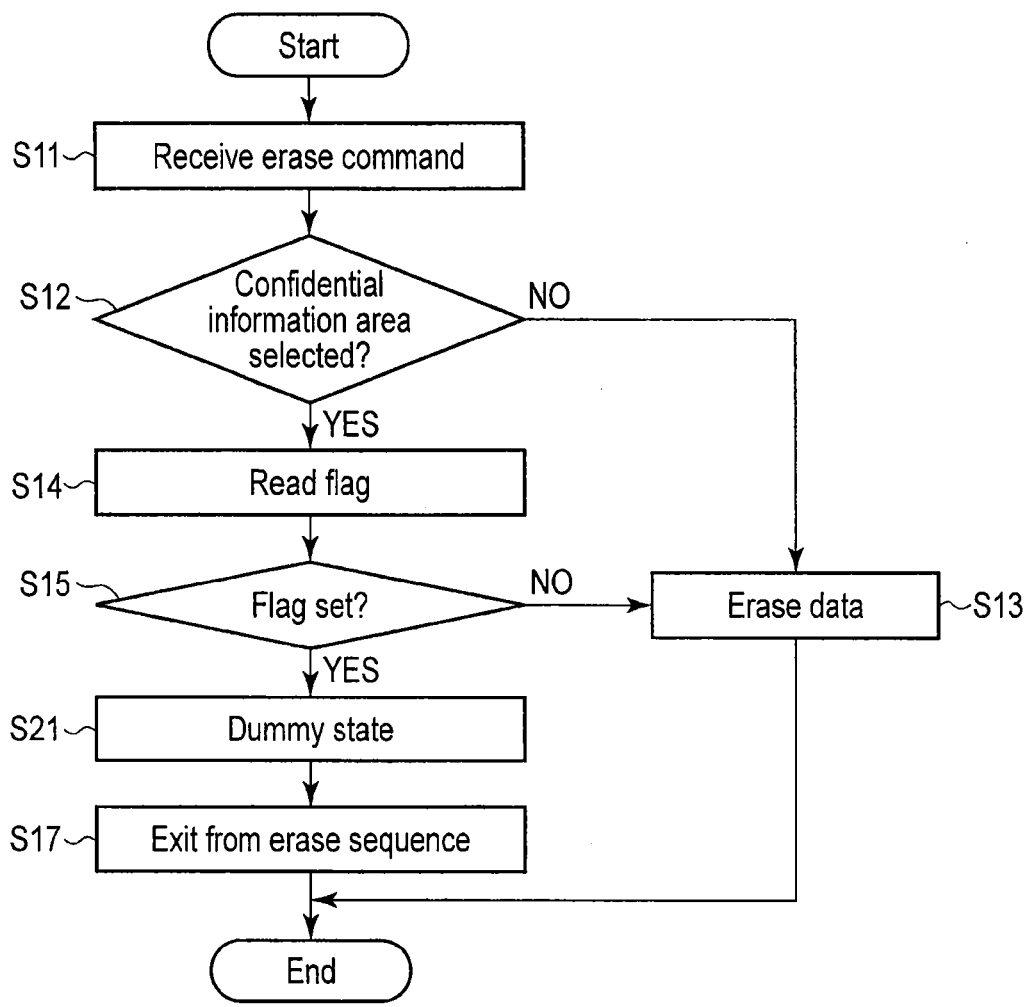
FIG. 10 illustrates another example flowchart of a data erase sequence in the semiconductor memory device according to one embodiment.
Figure 11:
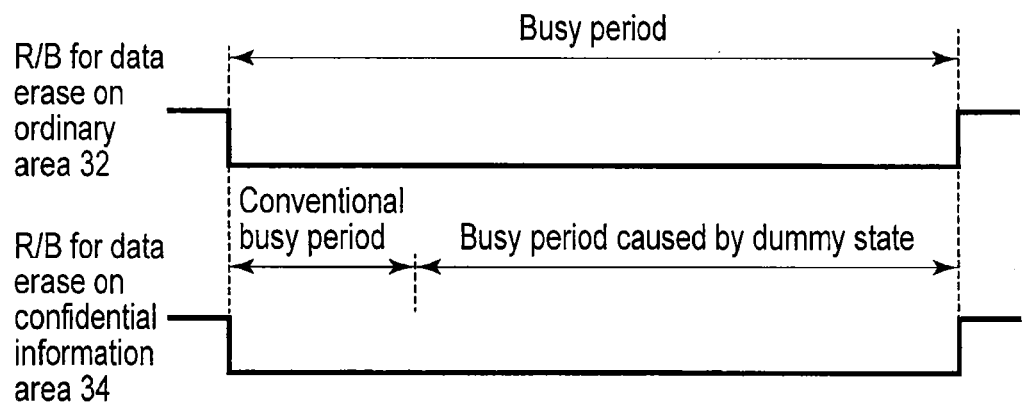
FIG. 11 illustrates other examples of ready/busy status in accordance with to to-be-erased areas according to one embodiment.

When the data erase on areas other than the confidential information area 34 is executed in the above erase sequences after shipment, a busy signal is output from the ready/busy output terminal (the ready/busy terminal) during the period from command reception in step S11 through the data erase in step S13 until the end of the erase sequence. As described above, the low or high level ready/busy signal may indicate, for example, the busy or ready status of the semiconductor memory device 1, respectively. Also as described above, when the confidential information area 34 is accessed, the erase sequence ends without execution of data erase in step S13. The time taken to erase the data in step S13 dominates the time taken for the erase sequence. Therefore, as shown in FIG. 9, when a case where the data erase on the confidential information area 34 is attempted is compared with a case of execution of data erase on an ordinary area 32, the latter one results in shorter busy time by skipping step S13. There is a concern that an attacker takes advantage of this phenomenon with slightly different addresses in order to know the address of the confidential information area 34, and successfully specify it. Then, as shown in FIG. 10, a dummy state (step S21) may be provided before exiting from the erase sequence. The semiconductor memory device 1 takes no particular action and waits during the dummy state, and then shifts to step S17. As a result, a period over which the busy signal is output through the ready/busy terminal equals the sum of the conventional duration and dummy busy period. Adjusting duration of the dummy state can equalize the busy period for the data erase on the confidential information area 34 to that of an ordinary area 32 ostensibly to outside the semiconductor memory device 1 as shown in FIG. 11. Such operation can prevent attackers from specifying a confidential information area through the difference of the busy periods.

Furthermore, the description will be made of measures for a possible case where the confidential information area 34 consists of a block and the result of the test in step S2 indicates such a confidential information block is physically defective. As shown in FIG. 12, multiple confidential information blocks such as the first confidential information area (block) 34a, the second confidential information area (block) 34b, and . . . are provided. The same confidential information is stored in the confidential information blocks. During the test process of step S2, when the first confidential information block 34a is determined defective, the second confidential information block 34b is used instead. Also when the first confidential information block 34a exhibits an acquired defect during the authentication after the shipment of the semiconductor memory device 1, the second confidential information block 34b is used instead of the first confidential information block 34a.

Figure 17:
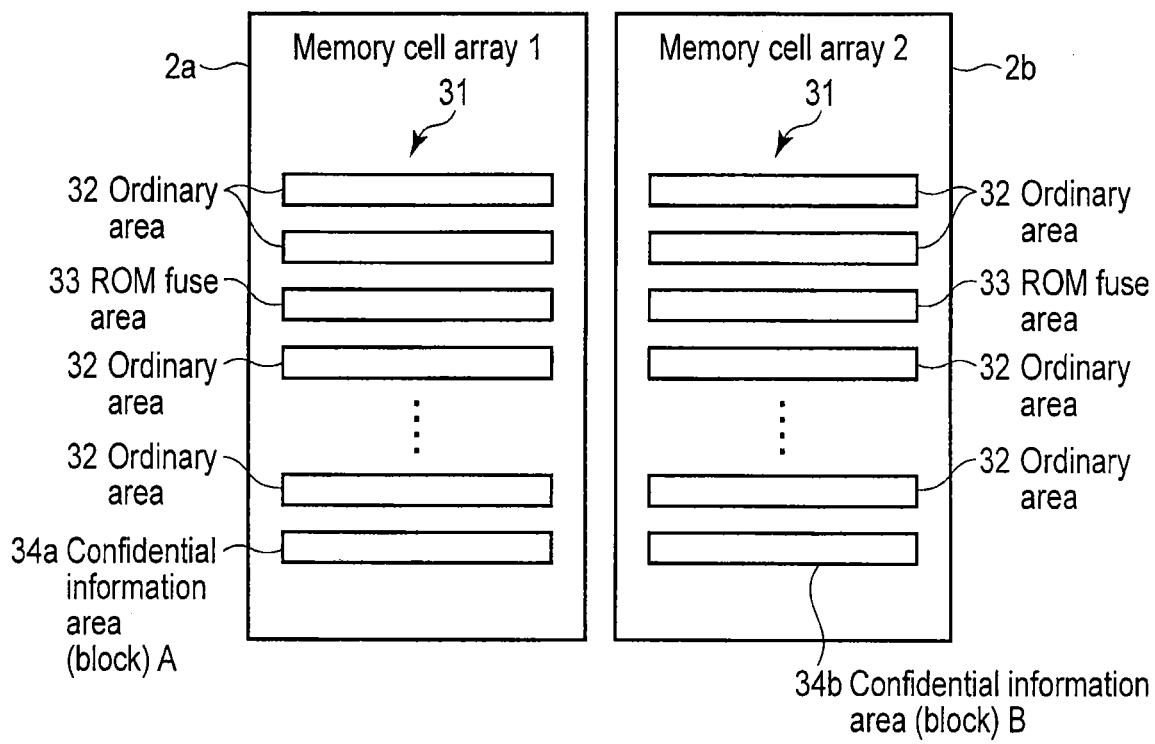
FIG. 17 illustrates an example arrangement of the confidential information area in the memory cell array according to one embodiment.

Moreover, when the semiconductor memory device 1 has multiple memory cell arrays 2, the first confidential information area (block) 34a and redundant second confidential information area (block) 34b may be provided in different memory cell arrays 2. FIG. 17 illustrates such an example. As shown in FIG. 17, the first confidential information area (block) 34a and second confidential information area (block) 34b are provided in the first memory cell array 2a and second memory cell array 2b, respectively.

Figure 18:
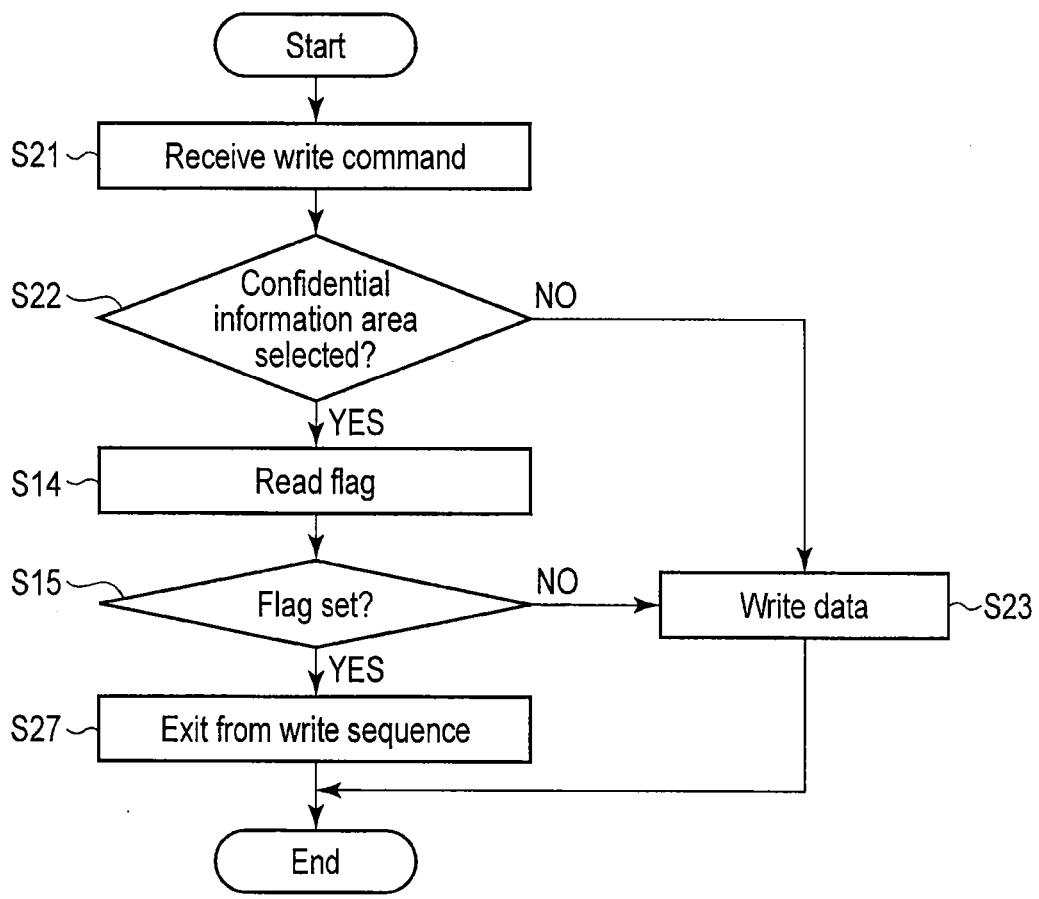
FIG. 18 illustrates a flowchart of data write sequence in the semiconductor memory device according to one embodiment.

The description has been made of an example where the flag is determined during the erase. It is because the erasure of confidential information is basically necessary before unauthorized rewriting of the confidential information already written at the time of the shipment of the semiconductor memory device 1, and hence using the flag to prevent unauthorized erasure to the confidential information area 34 can indirectly prevent unauthorized rewriting of the confidential information as described above. Alternatively or additionally to this example, the flag may be determined in response to write instructions to the confidential information area 34. FIG. 18 illustrates a flowchart of data write sequence in the semiconductor memory device according to one embodiment. The write sequence is fundamentally the same as that of the erase sequence (FIG. 8). The differences will be mainly described in the following. First, step S21 is executed instead of step S11. In step S21, the sequence controller 23 receives a write command as in step S11. Step S22 is then executed instead of step S12. In step S22, the address comparator 52 compares the address for to-be-written data associated with the write command with that of the confidential information area 34 to determine whether the confidential information area 34 is selected as in step S21.

When the determination in step S22 is NO, step S23 is executed instead of step S13. In step S23, the access controller 51 controls the associated components to write the data to the specified address as in step S13. In contrast, when the determination in step S22 is YES, the flow shifts to step S14. When it is determined NO in the subsequent step S15, the flow shifts to step S23. In contrast, when the determination in step S15 is YES, step S27 is executed instead of step S17. In step S27, the access controller 51 exits from the write sequence as in step S17.

Figure 19:
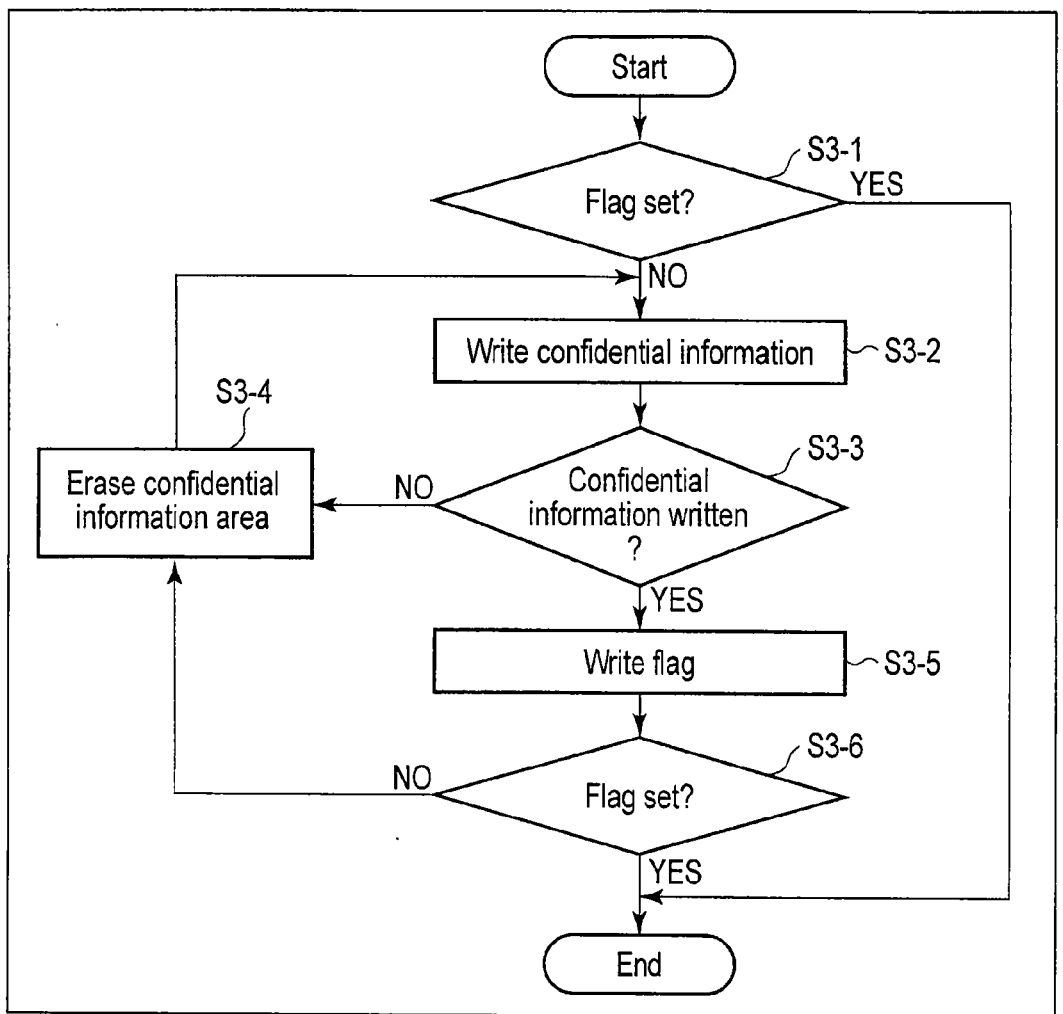
FIG. 19 illustrates the flow of step S3 of FIG. 6 in detail.
Figure 20:
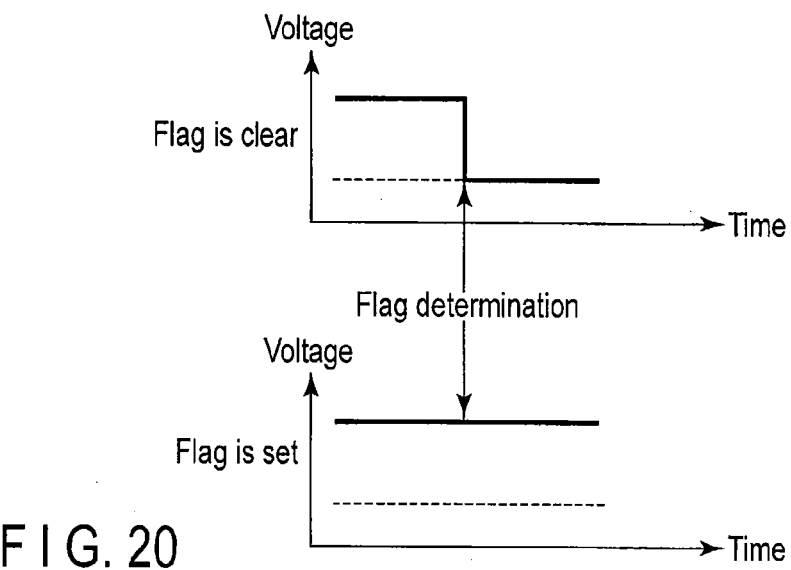
FIG. 20 illustrates states of the flag before and after the flag determination according to one embodiment.

Step S3 of FIG. 6 will now be described in detail with reference to FIGS. 19 and 20. FIG. 19 illustrates the flow of step S3 of FIG. 6 in detail. FIG. 20 illustrates states of the flag before and after the flag determination according to one embodiment. As shown in FIG. 19, a determination of whether set flag data is written is executed to the flag section 42 (step S3-1). As shown in FIG. 20, the (security) flag is high (set) by default, and becomes low (clear) after the flag determination. Therefore, if no flag determination is executed even without set flag data in the flag section 42, the flag is still set and, as a result, the writing and erasing to the confidential information area 34 is prohibited. For example, when erasing to the confidential information area 34 is attempted with the set flag, the access controller 51 exits from the erase sequence without the erasing in accordance with the sequence of FIG. 8. When writing to the confidential information area 34 is attempted, the access controller 51 exits from the write sequence without the writing in accordance with the sequence of FIG. 18. Thus, when the determination of step S3-1 is YES, step S3 is completed.

After the manufacture, it is assumed that the flag is clear before step S3, and therefore the flag determination in step S3-1 results in the flag of the low level (clear) from the high level. In contrast, if the threshold voltage of the memory cell or memory cells of the flag section 42 has accidentally become high, and as a result the flag is in the written state, execution of the flag determination keeps the high flag. For this reason, data cannot be written in the information storage area 41 belonging to the same confidential information area 34 as this flag section 42, and the confidential information area 34 is determined defective.

After the determination in step S3-1 makes the flag low, the flow shifts to step S3-2, where the confidential information is written in the confidential information area 41. Since the flag is low, the transition to a write step (step S23) is allowed in accordance with the determination in step S15 of FIG. 18, and hence the writing of the confidential information is allowed.

In step S3-3, it is determined whether the confidential information was successfully written using, for example status indicative of successful writing. When the writing to the confidential information area 41 fails, the confidential information area 34 is erased in step S3-4. If the flag is low (clear), the transition to an erase step (step S13) is allowed in accordance with the determination in step S15 of FIG. 8, and hence the erasing to the confidential information area is allowed.

When the determination in step S3-3 is YES (completion of writing of the confidential information), the flow shifts to step S3-5, where set flag data is written in the flag section 42. In step S3-6, it is determined whether the flag data is written. When the flag is not written (clear), erasing to the confidential information area is executed in step S3-4, followed by writing of the confidential information in step S3-2. Once the flag is written, writing or erasing to the confidential information area 34 is prohibited. It is because it is determined that the flag is in the written state at the flag determination step S15 of FIG. 8 or FIG. 18 as described above, and the access controller 51 exits the erasure or write sequence.

An example of the flag and determination of the read flag will now be described. The flag may include a specific bit string as described above. Alternatively, the flag may include the set (sequence) of a specific bit string and its complementary bit string. This can improve the reliability of the flag. Specifically, if a particular bit in the flag section 42 is unintentionally shifted to the written state for some reason, the flag does not function correctly. For example, the flag may be in the written state unintentionally even before the writing of the flag, and hence an erase sequence may be aborted during the erase test. More specifically, in the semiconductor memory device 1 immediately after the manufacture during the manufacture step (step S1) of FIG. 6, a cell transistor of the flag section 42 can have a high threshold voltage, or be in the written state. To address this, when the exclusive logical operation to pairs of a bit in the bit string and a corresponding complementary one results in more 0's (or 1's) than a threshold, it is determined the flag is set. It is possible that the flag includes a specific bit string and the complementary bit string before flag writing; however its possibility is significantly low. The greater the number of bits in a bit string (and also the number of bits in the complementary bit string), the higher the reliability of the flag.

Figure 14:
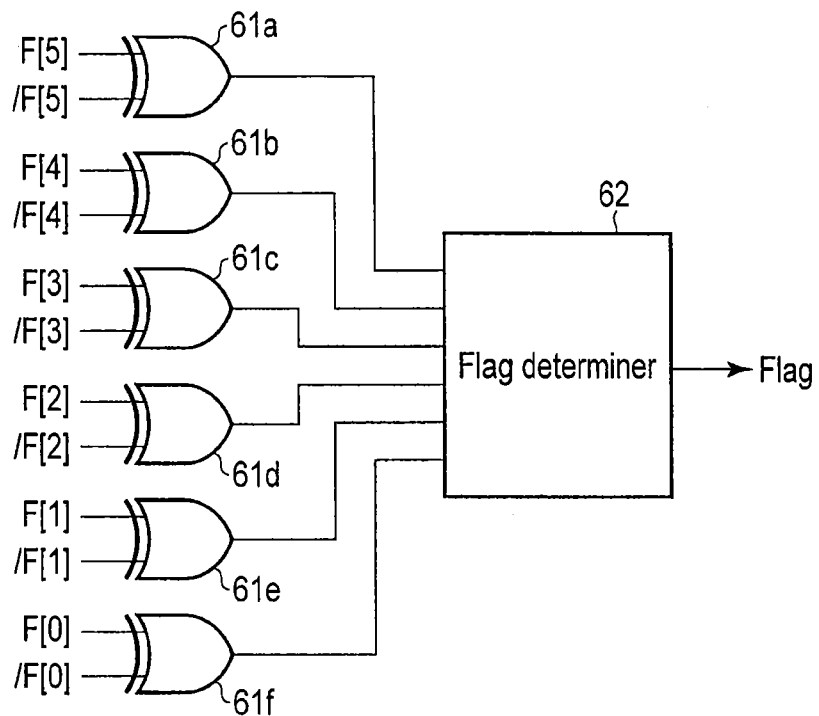
FIG. 14 illustrates an example flag determiner according to one embodiment.

A description will be made of a case where the flag section 42 includes multiple bits in detail. The controller 21 compares the values of respective bits in the flag section 42 with corresponding expected values, and it determines that the flag is set when the count of mismatch bits is less than or equal to a specific threshold. Alternatively, when the count of match bits is greater than or equal to the threshold, the controller 21 determines that the flag is set. As correspondence between a value held by a memory cell and an associated state, assume that a memory cell in the erased state stores 1 and that in the written state stores 0. Memory cells before the writing of the flag are in the erased state and hence the flag section 42 stores 1's. Assume that six bits (F[5] to F[0]) are provided for the flag and the set flag includes 010010. All bits in the erased state are 1. As shown in FIG. 13, the complementary bits (/F[5] to /F[0]) are written to the respective adjoining bits during writing of the flag. When the flag is read, the exclusive OR (XOR) is calculated for the bits and respective corresponding complementary bits. The two-input XOR logic outputs 1 when the two inputs differ in polarity. The output of the XOR is 1 when a pair of bits stores the value complementary to each other. The exclusive ORs of F[5] to F[0] and respective corresponding complementary bits are calculated by XOR gates 61a to 61f, respectively, and the six-bit output is input to the flag determiner 62 whose result will be the flag as shown in FIG. 14. As the criterion of determination of the flag determiner 62, when five bits or more of the six-bit exclusive-OR result input to the flag determiner 62 are 1, it may be determined the flag is written, or set. The configuration of FIG. 14 is provided, for example in the flag determiner 53 (see FIG. 7).

Figure 21:
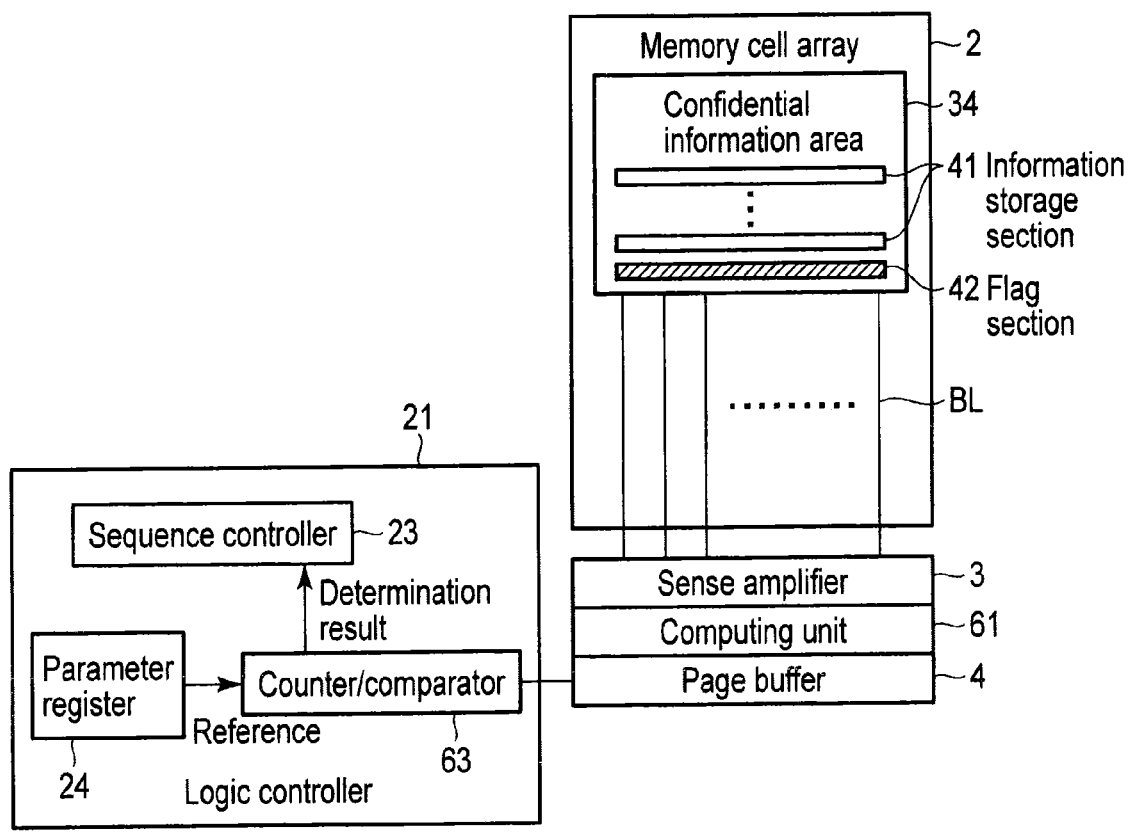
FIG. 21 illustrates some components of the semiconductor memory devices according to one embodiment.
Figure 22:
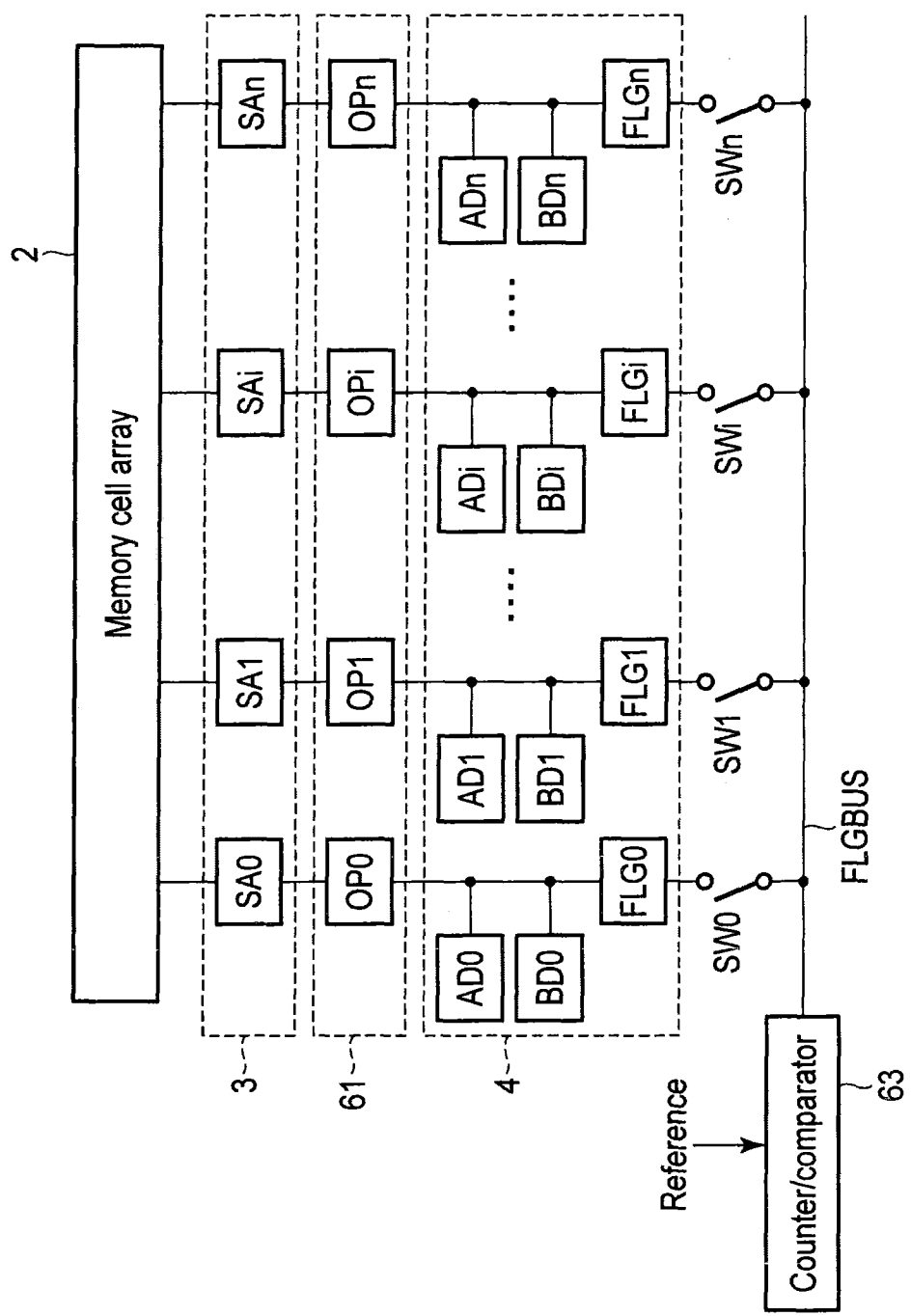
FIG. 22 illustrates details of a part of FIG. 21.

Another example where the flag section 42 includes two bits or more will be described. In particular, the description will be made to a case of a whole page assigned for the flag data as in FIG. 15. FIG. 21 illustrates some components of the semiconductor memory devices according to one embodiment, especially those associated with determination sequence controller 23, for example. As shown in FIG. 21, the semiconductor memory device further includes a computing unit 64. The logic controller 21 includes a counter/comparator 63 as well as components in FIG. 1. FIG. 22 illustrates a part of FIG. 21 in detail. As shown in FIG. 22, the sense amplifier 3 includes n+1 sense amplifier circuits SA0 to SAn. The computing unit 64 includes n+1 operational circuits OP0 to OPn. The page buffer 4 includes n+1 data latches AD0 to ADn, n+1 data latches BD0 to BDn, and n+1 flag latches FLG0 to FLGn. The sense amplifier circuit SA0, operational circuit OP0, data latches AD0 and BD0, and flag latch FLG0 serve for the bit line BL0. Similarly, the sense amplifier circuit SAi, operational circuit OPi, data latches ADi and BDi, and flag latch FLGi serve for bit line BLi, where i is 0 or a natural number of 1 to n. The flag latches FLG0 to FLGn are coupled to a bus FLGBUS via switches SW0 to SWn, respectively. The bus FLGBUS is coupled to the counter/comparator 63. The operation is as follows. The following operation may be controlled by the sequence controller 23, for example.

Assume that set bits in the flag section 42 store specific data (for example, 1 or 0). First, data of bits in the flag section 42 is read to data latches AD0 to ADn, respectively. The same values as the set flag values are set to data latches BD0 to BDn from the logic controller 21. The operational circuit OP0 calculates the exclusive OR (XOR) of the data in the data latches AD0 and BD0, and stores the result in the flag latch FLG0. The result of the XOR will be 1 when the data in the data latch AD0 differs from that in the data latch BD0. Similarly, operational circuit OPi calculates the XOR of the data in the data latches ADi and BDi, and stores the result in the flag latch FLGi. The switch SW0 is turned on, and hence the data in the flag latch FLG0 is supplied to the counter/comparator 63. The counter/comparator 63 increments by one when the received data is 1. Similarly, switches SW1 to SWn are turned on one after another, and hence the count of 1 data in the flag latches FLG0 to FLGn are counted. In other words, the count of the fail bits in a page is obtained. The counter/comparator 63 receives a reference equal to the number of fail bits acceptable in a page from the parameter register 24. The counter/comparator 63 compares the fail bit counts in a page with the reference. When the count is less than or equal to the reference, the counter/comparator 63 transmits a signal indicative of pass determination to the sequence controller 23. It transmits a signal indicative of fail determination to the sequence controller 23 when the count is above the reference.

The circuit to read and determine the flag can be implemented by a circuit to control the power-on read if the semiconductor memory device is provided with such a circuit. Using the circuit can prevent the entire circuit area from increasing.

The circuit to read and determine the flag can also be implemented by a circuit to execute verify read to count unwritten bits if the semiconductor memory device is provided with such a circuit.

As described above, in the semiconductor memory device 1 according to embodiments, data can be written only to memory cells in the memory cell array 2 which are in the data erased state, and the confidential information area 34 includes the set flag after writing of the confidential information. When the semiconductor memory device 1 receives a data erase request specifying the confidential information area 34, it determines the flag, and it does not execute the data erase when the flag is set. The semiconductor memory device 1 includes the sequence controller 23 to execute such a process. Therefore, the erasure of the confidential information in the confidential information area 34 can be prevented, and hence rewriting of the confidential information is avoided. Also to a data write request specifying the confidential information area 34, the semiconductor memory device 1 does not execute the data write when the flag is set. This can further improve protection of the confidential information area 34. Moreover, the flag is written after the test process. For this reason, erasure of the data in the confidential information area 34 during the test is allowed, and hence the implementation of the test and prohibition on the confidential information erasure are compatible.

The memory device with the authentication function described so far is generally coupled to a host with such function via a controller. However, the memory device with the authentication function can also be used for use without the function. If the device has no data written in confidential information area (so-called white ROM) because of no intention to use the authentication function, attackers may write data in the area to pass the authentication to produce a memory device which acts like an authorized one. It is also not desirable to write the confidential information in the confidential information area 34 as in the memory with the authentication function because a risk of confidential information being leaked increases. To address this, dummy data and flag can be written to the confidential information area 34, and no problem arises for application of using a normal controller (without the authentication function) to such a memory. In contrast, for application of using a controller with the authentication function and the memory with dummy data and flag to implement the memory for no authentication use, the following measure can be taken. The authenticator 25 should execute the authentication sequence as with the authentication function and output the result of the operation to a controller outside the semiconductor memory device 1. The result of the operation to the dummy data should generally result in failed authentication; however the controller should be configured to operate while ignoring the authentication result for no authentication function use.

Figure 23:
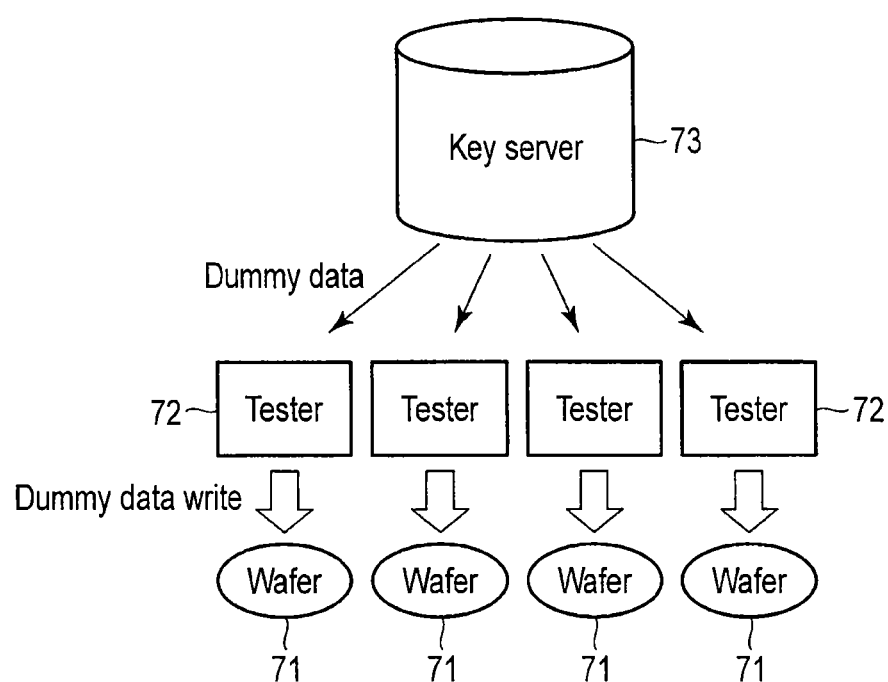
FIG. 23 illustrates writing of dummy data according to one embodiment.
Figure 24:
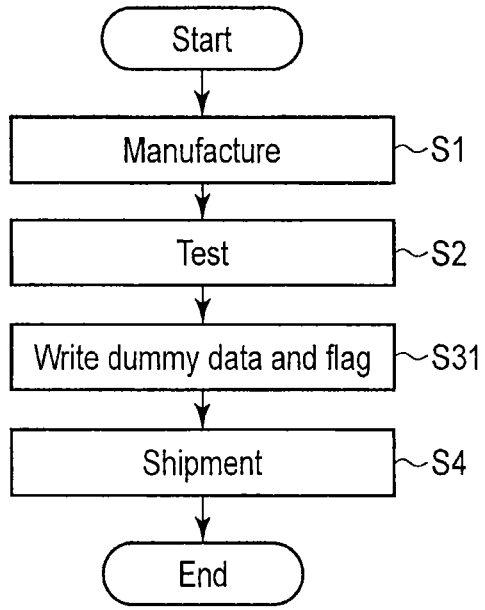
FIG. 24 illustrates another example flowchart from the manufacture to shipment of the semiconductor memory device according to one embodiment.

The dummy data write may be performed using a system of FIG. 23. The FIG. 23 system is principally the same as the FIG. 16 system. Only difference is dummy data being supplied to the tester 72 instead of the key data in FIG. 16. The dummy data may be the same for all or some wafers, or may differ. The dummy data is written at the same timing as the confidential information write as shown in FIG. 24. FIG. 24 illustrates another example flowchart from the manufacture to shipment of the semiconductor memory device according to one embodiment. In FIG. 24, step S31 is executed instead of step S3 of FIG. 6. In step S31, the dummy data and flag is written to the confidential information area 34.

Figure 25:
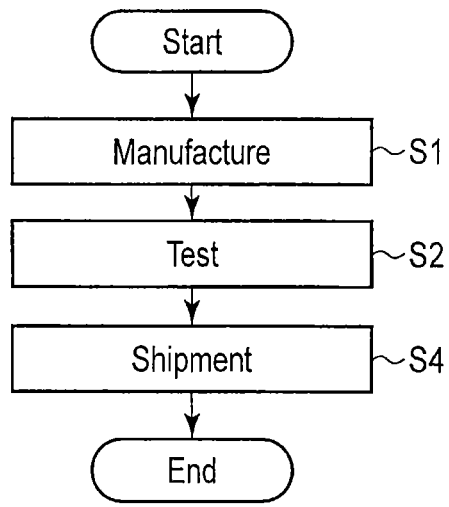
FIG. 25 illustrates a flowchart from the manufacture to shipment of the conventional semiconductor memory device.

Such practice enables the semiconductor memory device with the authentication function according to embodiments to be used for normal use, or with no authentication function. In other words, the semiconductor memory device according to embodiments can be used both with and without the authentication function. For the use without the authentication function, the step of writing the dummy data and flag (S31) is added to the conventional flow (FIG. 25). This regard is different between the flow of the embodiments and the conventional flow.

Second Embodiment

The second embodiment relates to a storage method of various flags.

The flag according to the first embodiment indicates whether writing to and/or erasure of an information storage section 41 in the confidential information area 34 including that flag is permitted, and it is hereinafter referred to as an erase/write flag to be distinguished from a general flag. Various flags may be defined for the semiconductor memory device 1 as well as the erase/write flag. A flag is generally written in each page, and indicates various information on the page including that flag.

Examples of the flag may include an LM flag, a smart verification (SV) flag, and the like. The LM flag indicates whether a physical page including that LM flag is written to in its upper page. The LM flag is represented as one-bit information, for example. The one-bit information is displayed with eight bits (or one column) as shown in FIG. 26, for example. FIG. 26 illustrates an example of an ordinary area (for example, ordinary area 32). The ordinary area is illustrated as consisting of one block BK. As shown in FIG. 26, each physical page in the ordinary area includes an information storage section (or user-data storage section) 101 and the flag section 102. Each information storage section 101 stores user data. Each flag section 102 includes an LM flag area 102A and an SV flag area 102B. The LM flag area 102A stores, in the six bits other than the end bits, 0 to indicate a clear flag or 1 to indicate a set flag. Distinction of the LM flag is executed by determination of which of the 0's and the 1's included in the eight-bit set outnumbers the other. Accordingly, at most three-bit error is acceptable in the context. In contrast, the flag is vulnerable to whole column defect, and attempting to increase its quantity of information (or the number of the indicator bits) to address errors results in an increased area of a circuit to determine the majority.

The SV flag is represented as four-bit information, displayed with eight bits, and stores information on writing to a lower page, such as a loop count of writing and hence the write voltage magnitude which led to successful writing, for example. Using the information on the writing to the lower page to adjust voltage for writing to an upper page can improve efficiency of writing to the upper page. The first four bits in the SV flag area 102B indicates the SV flag itself, and the last four bits are complementary with the first four bits, respectively. Determining the SV flag is performed by determining whether the first four bits are correctly complementary with the last four bits. Accordingly, no bit errors are acceptable in the eight bits in this context. A two-bit error leads to an undetectable incorrect determination, i.e., erroneous pass determination through error values.

As described, prevention of incorrect flag writing is required. To address this, a special check is performed only on the flag section 102 after flag writing. Specifically, the flag is written in with special care to guarantee no incorrect writing. Such writing, however, invites deterioration of write performance. The quantity of information per flag may also be increased to address the errors, such as a flag displayed with two or more columns. Increasing the number of columns, however, requires increased lengths of physical pages, which is difficult to implement. The information storage section 101 cannot also be reduced in order to increase the flag section 102 because it spoils user convenience. The second embodiment developed in accordance with the background will now be described.

Figure 27:
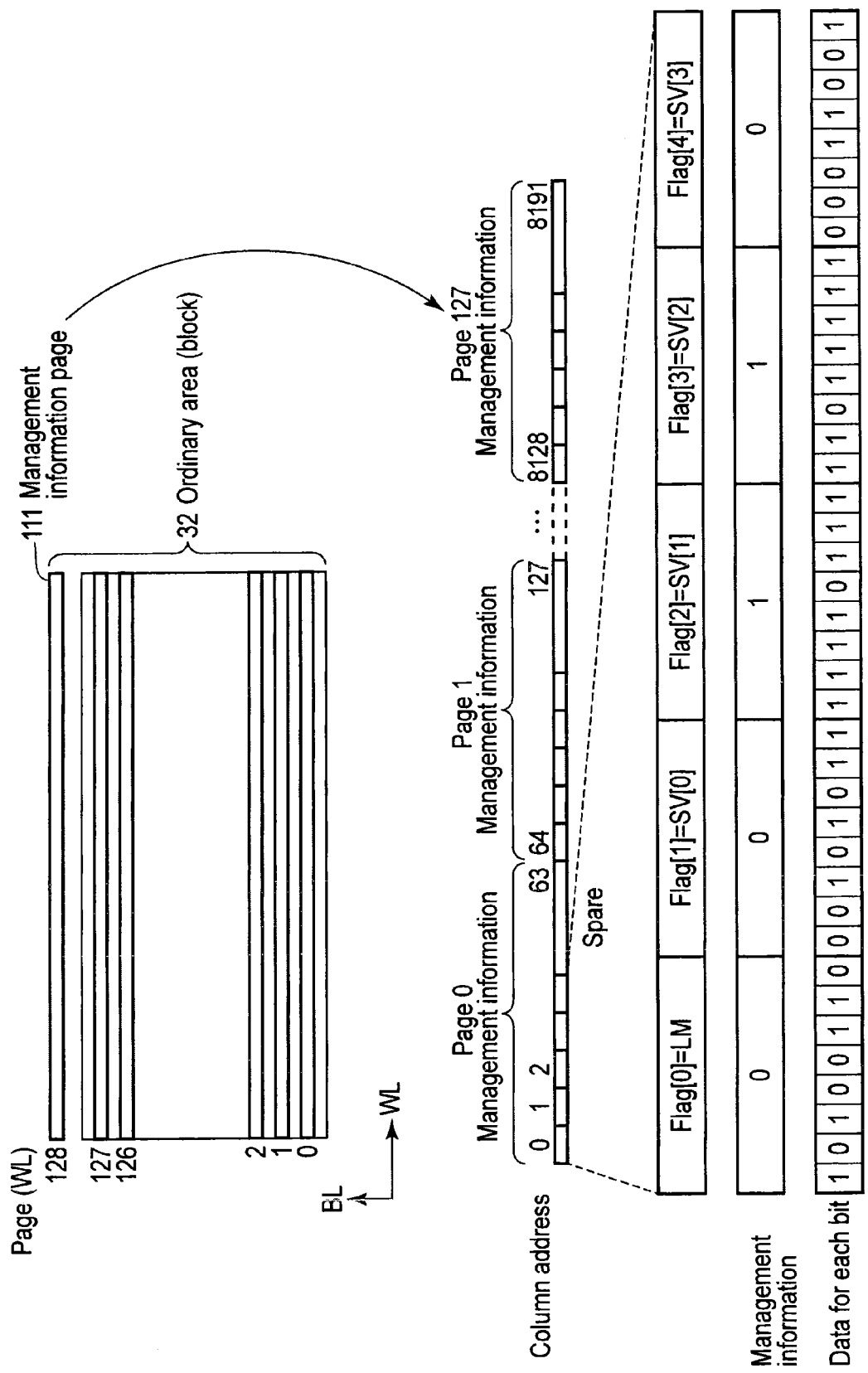
FIG. 27 illustrates a part of an ordinary area according to a second embodiment.

FIG. 27 illustrates a part of an ordinary area according to the second embodiment. As shown in FIG. 27, one block, which includes, for example, 128 physical pages, is provided with one physical page 111, which is associated with that block and referred to as a management information page. The management information page 111 is also a part of the ordinary area 32. The management information page 111 stores all management information (for example, flags) of all pages PG in the block BK associated with that management information page 111. As the flags, the LM flag and SV flag are defined, for example; however, any other flags can be used. Physical pages PG in the block BK do not include corresponding flags and are referred to as information storage pages. As an example, the LM flag is represented by one bit and SV flag by four bits. The type and representation of the flags are not limited to the following examples, but any other ones are applicable to the present embodiment.

The management information page 111 includes areas for respective management information of physical pages PG0 to PG127 in the corresponding block BK. The areas for physical pages PG0 to PG127 are typically located in the ascending order. Each of areas for physical pages PG0 to PG127 has the same structure as that typically shown in FIG. 27, which shows the area for physical page PG0, for example. Different areas, however, may have different structures.

The area for physical page PG0 is further divided into partitions for respective bits for all management information for physical page PG0. The first partition (Flag [0]) is assigned to one bit of the LM flag (LM). The second to fifth partitions (Flag [1] to Flag [4]) are assigned to the first to fourth bits of the SV flag (SV [0] to SV [3]), respectively. The remaining partitions are assigned to bits of any other management information, and those not assigned to management information are reserved for spare. Assume that one page has 65536 bits (=8192 bytes) in length, each of the areas for physical pages PG0 to PG127 can store the management information bits of m=64 in accordance with the management information page 111 storing the management information for the 128 physical pages.

FIG. 27 illustrates an example of the first to fifth partitions (Flag [0] to Flag [4]) storing 0, 0, 1, 1, and 0, respectively. In other words, the LM flag of 0 and SV flag of 0110 are stored. Each partition consists of n=8 bits (or one column), for example. In other words, 1 bit of management information is displayed by a column. The management information bit 1 may be displayed with a set of all 1 bits. A management information bit, however, is determined by determining whether the 1 bit count exceeds a threshold, as will be described. For this reason, all bits are not necessarily 1, which is the case in the figure. In contrast, management information bit 0 is displayed with eight-bit random data. The random data refers to data represented by one-bit-information indicating two or more specific bits (n bits in the context) generated by an algorithm.

Figure 28:
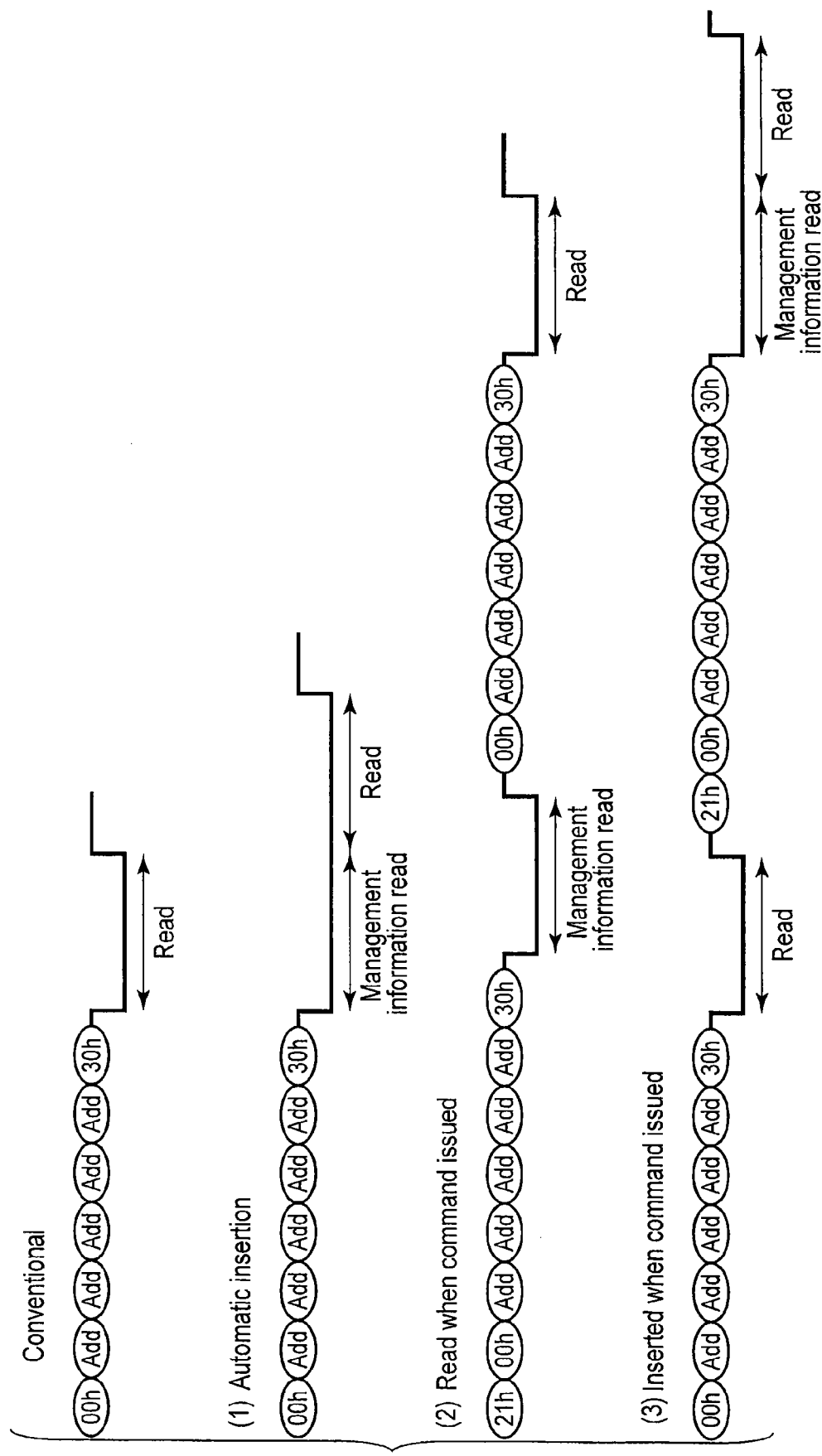
FIG. 28 illustrates an example sequence of management information page determination according to the second embodiment.

FIG. 28 illustrates an example of a sequence of management information page determination according to the second embodiment. The top row in FIG. 28 illustrates a sequence of conventional data read without management information page read. First, a command 00h (or a read command), addresses Add of one or more logical pages to be read, and command 30h (or an address end command) are supplied to the semiconductor memory device 1 from a controller outside the semiconductor memory device 1. Responding to this, the sequence controller 23 controls related components to output the data in the logical pages specified by the addresses to outside the semiconductor memory device 1. The second, third and bottom rows show examples of sequences with management information page determination. The second row shows an example of management information page determination uniformly added to the conventional read. As shown in the second row, when the semiconductor memory device 1 receives command 00h, addresses, and command 30h, it reads the management information page before data read. The sequence controller 23 stores the management information in the management information page in, for example, a register in the sequence controller 23, such as the parameter register 24. The management information page read will be described later. The sequence controller 23 then reads in accordance with the management information stored in the register, such as the LM flag. The figure shows only data read; however, the principle is applicable to data write. Specifically, upon writing, the sequence controller 23 reads the management information page, stores this in the register, and writes in accordance with the management information in the register, such as the SV flag. This applicability also applies to the following third and bottom rows.

The third row shows an example where a command for management information page read is defined. Upon management information page read, an external controller supplies a command for that purpose (21h) to the semiconductor memory device 1. The sequence controller 23 is configured to recognize command 21h. After command 21h, the external controller supplies command 00h, addresses, and command 30h to the semiconductor memory device 1. The sequence controller 23, in accordance with command 21h having been received first, reads the management information page 111 including the management information for the logical pages to be read, and stores it in, for example, the register (not shown) in the sequence controller 23. Without command 21h before command 00h, data is read from specified pages as in the conventional case. Responding to the read instruction, the sequence controller 23 then reads in accordance with the management information in the register as described for the first row.

The bottom row also shows an example where a command for management information page determination is defined. In this example, when command 21h exists prior to command 00h, the sequence controller 23 reads the management information page associated with the logical pages to be read, stores the management information in the register, and reads in accordance with the management information in the register. Without command 21h before command 00h, data is read from specified pages as in the conventional case.

Figure 29:
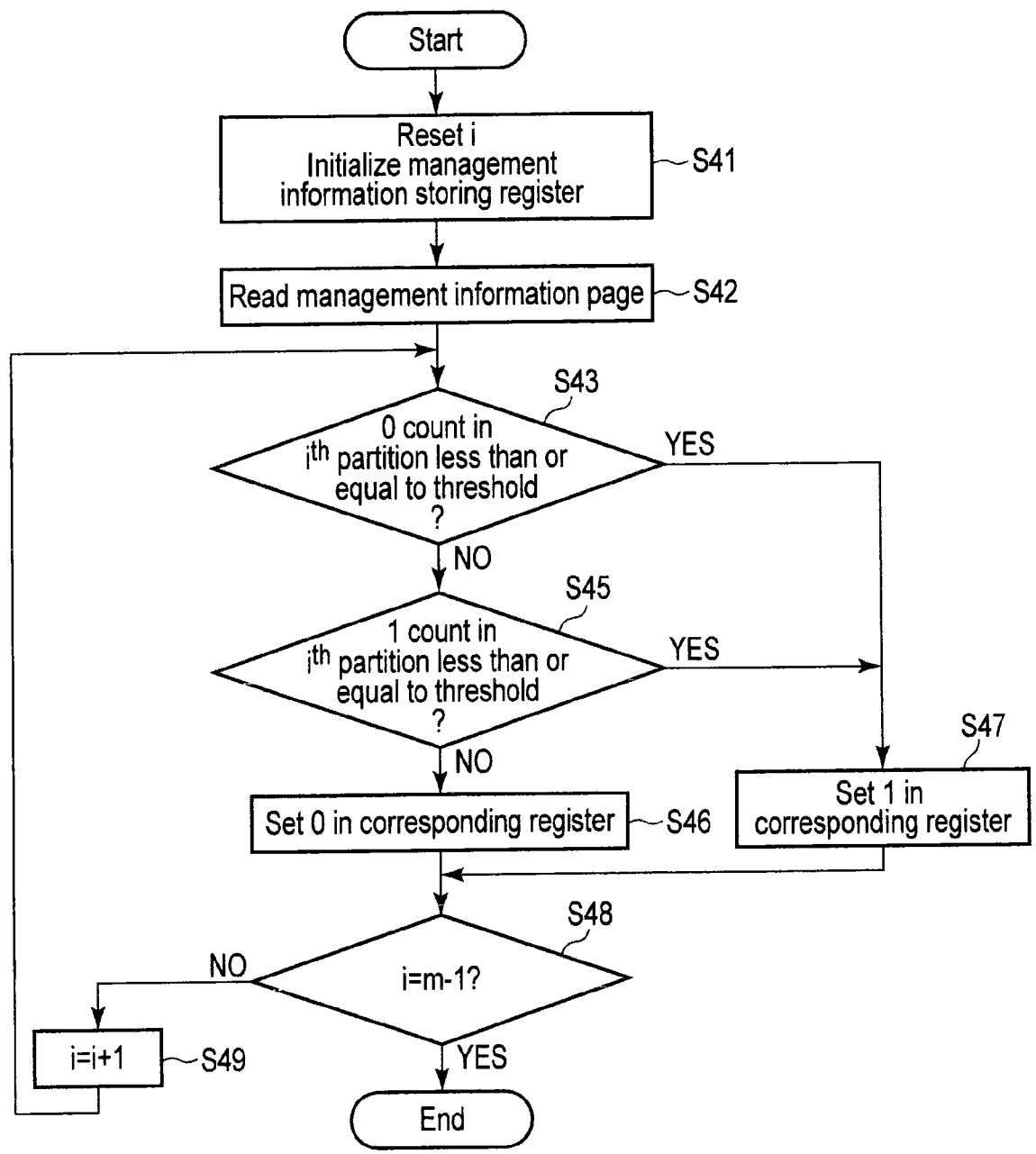
FIG. 29 illustrates a flowchart of management information page read according to the second embodiment.

FIG. 29 illustrates a flowchart of management information page read according to the second embodiment. The FIG. 29 flow is executed by the sequence controller 23, for example. Specifically, when the sequence controller 23 recognizes an instruction of the management information page read in accordance with any of the second to bottom rows of FIG. 28 implemented, management information page read of FIG. 29 is executed. When the sequence controller 23 recognizes the instruction of management information page read, it resets a parameter i to 0, and initializes values (Flag [0] to Flag [m−1]) in the register which stores management information in a management information page to be read to the erased state (step S41). The parameter i specifies a partition, and is stored in the counter/register in the sequence controller 23, for example. The sequence controller 23 reads the data in the management information page, and stores it in a random access memory (RAM) in the semiconductor memory device 1, for example (step S42).

The sequence controller 23 then determines whether the 0 bit count in the $i^{th}$ partition is less than or equal to a threshold (step S43). When the 0 bit count is less than or equal to the threshold, the $i^{th}$ partition is determined not to store random data, and the flow shifts to step S47. When unrandom data is stored, all bits in the partition should be in erased state (or 1 state); however some bits can be actually reversed. For this reason, when it is determined that the 0 bit count is lower than an acceptable level instead of determination on whether all bits are 1, then the partition is determined to be in the erased state. In step S47, the sequence controller 23 sets 1 (or invalid) in the register for the management information bit corresponding to the $i^{th}$ partition. Step S47 is followed by step S48.

When the determination in step S43 is NO, the flow shifts to step S45, where the sequence controller 23 determines whether the 1 bit count in the $i^{th}$ partition is less than or equal to another threshold. When the 1 bit count is less than or equal to the threshold, the partition is determined not to store random data, and the flow shifts to step S47. In contrast, when the 1 bit count exceeds the threshold, this indicates that both 0 bit count and 1 bit count exceed the thresholds. In accordance with this, the $i^{th}$ partition is determined to store random data, which represents 0 bit. As a result, the sequence controller 23 sets 0 (or valid) in the register for the management information bit corresponding to the $i^{th}$ partition (step S46). Step S46 is followed by step S48.

In step S48, the sequence controller 23 determines whether the parameter i is m−1, i.e., all partitions have been determined. When the determination in step S48 is NO, the sequence controller 23 increments the parameter i by one (step S49), and the flow shifts to step S43. When the determination in step S48 is YES, the management information page read is completed.

As described above, according to the semiconductor memory device according to the second embodiment, all management information (or flags) for physical pages (for example, all physical pages in one block) are gathered in one physical page. This can increase n (or the number of bits to display one management-information bit) only by subtracting m (or the number of management information bits in one page). Increasing n can improve read error tolerance of the management information. This does not require change of the design of the memory cell array, for example, increasing the page length.

Moreover, a management information bit is determined through a determination of whether random data exists in the corresponding partition. The determination of whether random data exists is executed by scanning 0 and/or 1 bits and comparing them with the thresholds. The bit scan and comparison with the thresholds are executed with a bit scan circuit which is originally provided for writing and erasure. For this reason, no new circuit is necessary to determine the management information bits.

Third Embodiment

The second embodiment relates to gathering the management information for pages, i.e., the flags. The third embodiment relates to display of management information on a block in one page.

Figure 30:
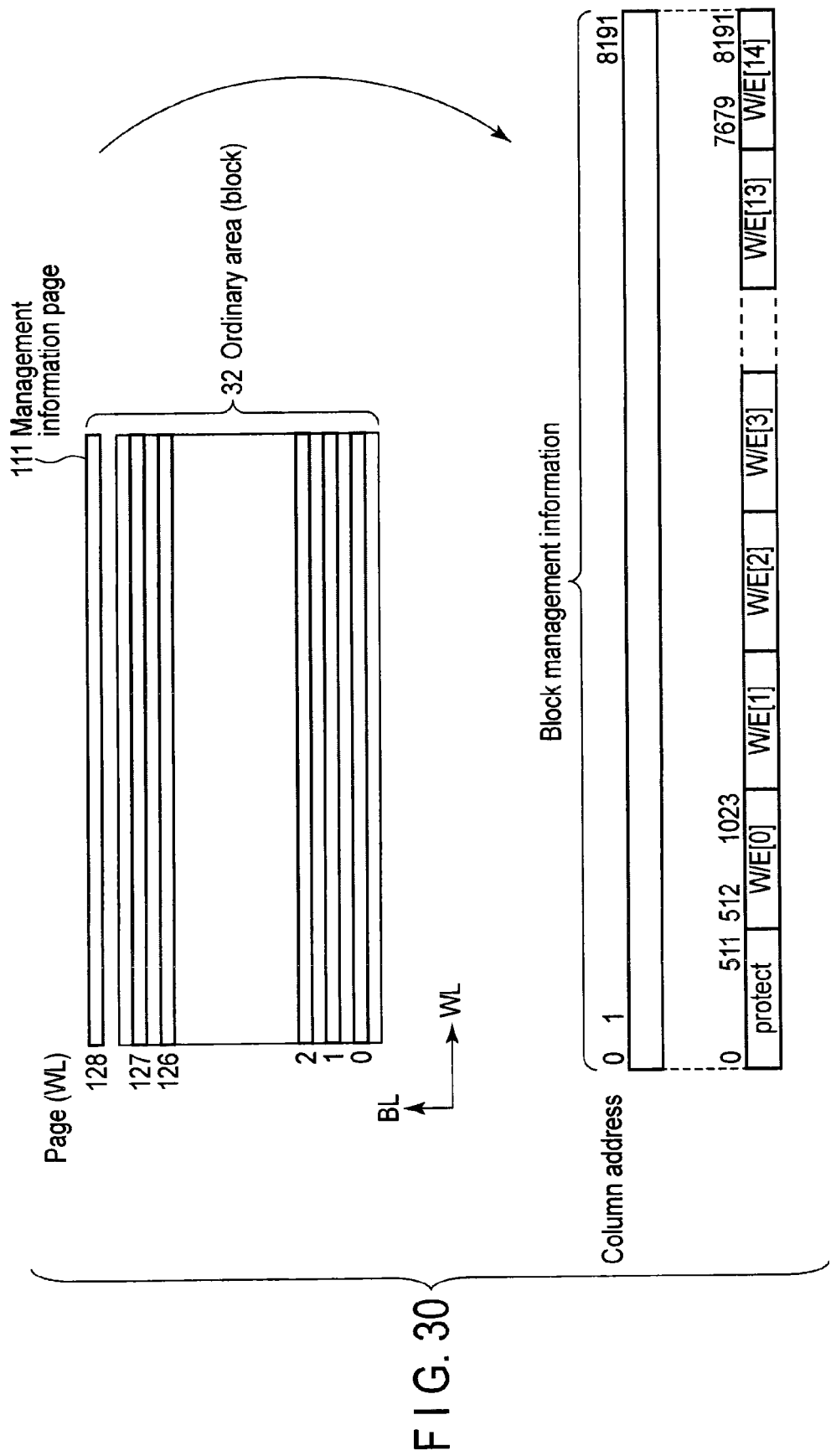
FIG. 30 illustrates a part of an ordinary area according to a third embodiment.

FIG. 30 illustrates a part of an ordinary area according to the third embodiment. As shown in FIG. 30, one block for ordinary area (or ordinary block) is provided with a management information page 111 associated with that block as in the second embodiment. The management information page 111 includes partitions as in the second embodiment. The number of partitions included matches with that of management information bits stored in the management information page ill. FIG. 30 relates to an example of sixteen management information bits. For an example of one page of 8192 bytes (=65536 bits), each partition has a size of 512 columns (or bytes). As an example, one of sixteen management information bits serves as a flag indicating write permission or prohibition, and the remaining fifteen bits indicate an erase or write count. For example, the first partition (protect) is assigned to one bit indicating erase permission/prohibition. The second to sixteenth partitions (W/E [0] to W/E [14]) are assigned to respective bits of fifteen-bit erase/write count. Each partition stores substantially all 1 bits in order to indicate the corresponding management information bit 1, or stores random data of n=4096 bits in order to indicate the corresponding management information bit 0 as in the second embodiment.

The management information page 111 is read at specific timings. For example, the sequence controller 23 follows instructions from an external controller, and reads all or some of management information pages 111 in the semiconductor memory device 1 after turning on the semiconductor memory device 1. The sequence controller 23 compares the 0 bit count and 1 bit count in each partition with respective thresholds in the read management information page as in the second embodiment (FIG. 29), which corresponds to step S43 and S45. With this comparison, the sequence controller 23 determines whether random data is stored in each partition, and whether the corresponding management information bit is 0 or 1. The determined management information is stored, for example, in a register in the sequence controller 23, which corresponds to step S46 and S47. Alternatively, the reading of the management information page 111 is triggered by the sequence controller 23 at specific timings as in the second embodiment. Specifically, as in the second row of FIG. 28, whenever instructed to write to or erase an ordinary block, the sequence controller 23 reads the corresponding management information page prior to the write or erase. When the corresponding block is prohibited for write and/or erase, the sequence controller 23 does not write and/or erase. The same holds true for the erase or write count. Specifically, whenever instructed to erase and/or write to an ordinary block, the sequence controller 23 determines whether each partition stores random data in order to determine 0 or 1 of each bit, and stores the determined values in the register.

As described above, according to the semiconductor memory device according to the third embodiment, the management information on a block is stored in a management information page. This simplifies change of the definition (for example, its type and/or the number of n) of the management information bit as in the second embodiment. Moreover, no new circuit to determine the management information bits is necessary as in the second embodiment.

Fourth Embodiment

As described above, it is necessary to write confidential information in the confidential information area 34 after the semiconductor memory device 1 is manufactured but before it is shipped, and to prohibit erase and/or writing to the confidential information area 34 after the shipment. With such background, the fourth embodiment relates to application of the management information page to a block for confidential information area (confidential information block), and to details of the first embodiment.

Figure 31:
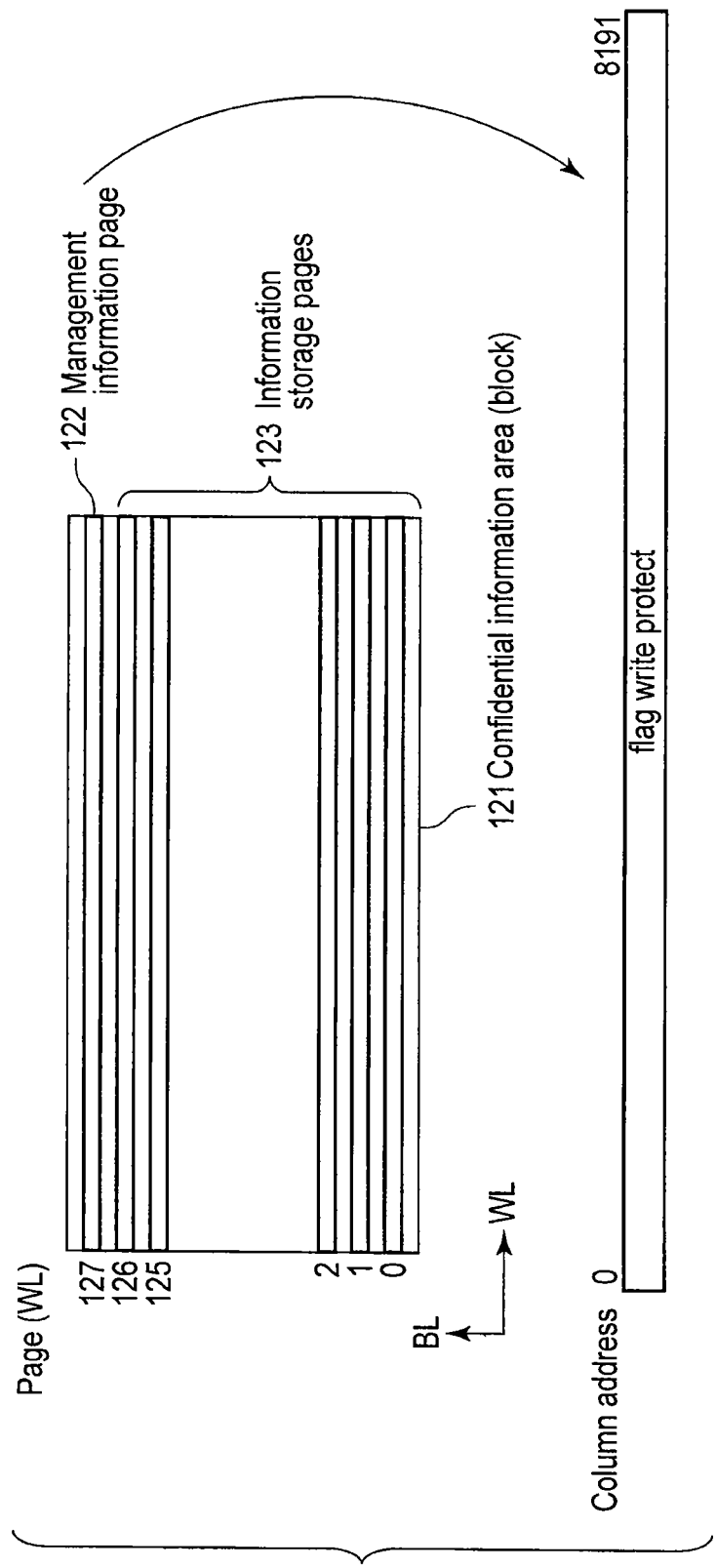
FIG. 31 illustrates a part of a confidential information area according to a fourth embodiment.

FIG. 31 illustrates a part of a confidential information area according to the fourth embodiment. As shown in FIG. 31, a confidential information area (block) 121 includes a management information page 122. The management information page 122 is the last page in the confidential information block 121, for example. The remaining physical pages in the confidential information block 121 are information storage pages 123 to store confidential information. The management information page 122 stores the flag of the first embodiment (i.e., the erase/write flag) as a whole. The erase/write flag indicates whether the corresponding confidential information block 121 can be erased and/or written or not.

The erase/write flag is displayed using random data that spreads over the whole management information page 122. Specifically, the erase/write flag is 1 (erase/write permitted) when the whole management information page 122 is in the erased state, or when it actually includes a number of 0 bits less than or equal to a threshold as will be described later. In contrast, when random data is stored in the management information page 122, the erase/write flag is 0 (erase/write prohibited).

Figure 32:
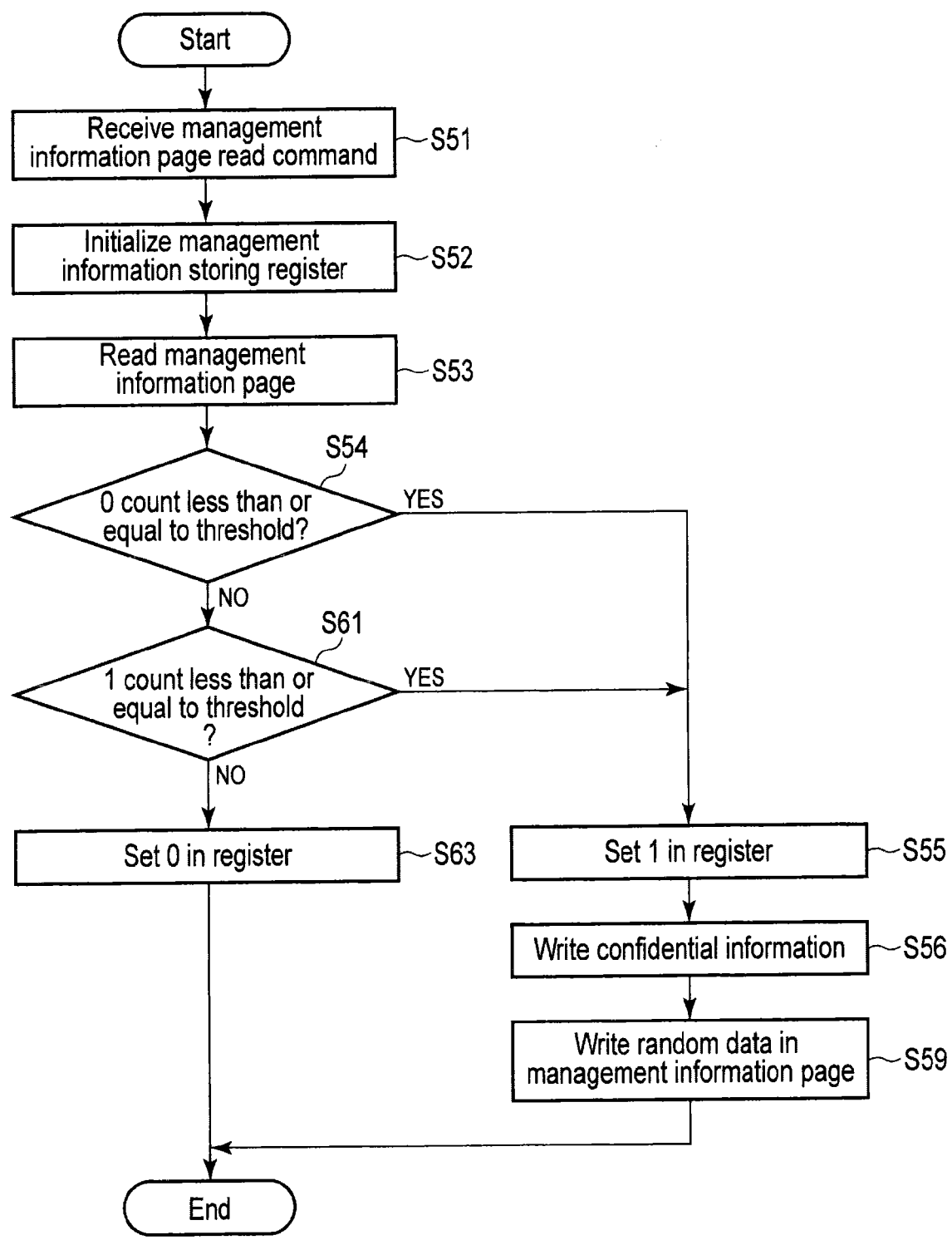
FIG. 32 illustrates a flowchart of management information page read according to the fourth embodiment.

FIG. 32 is a flowchart of management information read according to the fourth embodiment. The FIG. 32 flow relates to before and after shipment of the semiconductor memory device 1, and it will be described along time. Note that, no confidential information is written in, for example, a confidential information block at the start of the flow. Moreover, for example, no data is written in the semiconductor memory device 1, and hence the management information page 122 is also in the erased state.

As shown in FIG. 32, the semiconductor memory device 1 receives a command to read the management information page (step S51). This command is intended to be used before the shipment, not intended to be used by a user after shipment, or not intended to be disclosed. Responding to the reception of the command, the sequence controller 23 initializes a register holding to-be-read management information (or erase/write flag) in the management information page to the erased state (step S52). The register may be provided in, for example, the sequence controller 23, and may be the parameter register 24. The sequence controller 23 then controls associated components to read the data in the management information page 122, and store it in, for example, a RAM in the semiconductor memory device 1 (step S53). The sequence controller 23 determines whether the 0 bit count in the read data is less than or equal to a threshold as in step S43 (step S54). When the 0 bit count is less than or equal to the threshold, it is determined that random data is not stored in the management information page 122, i.e., that the erase/write flag is clear. In accordance with this determination, the flow shifts to step S55. As described above, when step S54 is first reached first, the management information page 122 is in the erased state, and hence the flow shifts to S55.

In step S55, the sequence controller 23 sets 1 (invalid) to the register holding the erase/write flag. The sequence controller 23 then receives confidential information from outside, and writes it in the confidential information block (step S56). Upon reception of the instruction for writing (and/or erase) to the confidential information block, the sequence controller 23 refers to the erase/write flag in the register. When the erase/write flag in the register is clear, the sequence controller 23 writes (or erases). The sequence controller 23 is configured so that it cannot write (and/or erase) to the confidential information block when the erase/write flag in the register indicates the prohibition. The erase/write flag should be clear in step S56, and hence the confidential information is successfully written. Responding to the command received from, for example, outside the semiconductor memory device 1, the sequence controller 23 writes random data in the management information page 122 (step S59). The erase/write flag is clear also at this stage, and hence the writing to the management information page 122 is permitted. Thus, the flow before the shipment associated with the fourth embodiment is completed.

The post-shipment will now be described. After the shipment, the management information page 122 stores random data. If a user obtains and uses a management information page read command through an unauthorized procedure, step S51 starts. The flow goes through steps S51 and S52 (or register initialization), and S53 (or management information page read) to reach step S54. The 0 bit count should exceed the threshold as a result of the determination in step S54 because the management information page 122 stores random data. As a result, the flow shifts to step S61.

In step S61, the sequence controller 23 determines whether the 1 bit count in read data is less than or equal to a threshold as in step S45. In accordance with the management information page 122 storing random data, the 1 bit count should also exceed the threshold. In accordance with the management information page storing random data through the determination in steps S54 and S61, the flow shifts to step S63. In step S63, the sequence controller 23 sets 0 (or set) in the erase/write flag holding register. The erase/write flag holding register stores the value indicative of erase/write prohibition. For this reason, even if an unauthorized user attempts to write (and/or, erase) to the confidential information block, this cannot be accomplished. In other words, when the management information page 122 stores random data, the flow cannot reach step S55. Therefore, no unauthorized user can set the erase/write flag in the register to indicate permission and rewrite the confidential information block. The sequence controller 23 is configured to set up the erase/write flag in the register only through the flow of FIG. 32. For this reason, no unauthorized user can write to the confidential information block.

When the 1 bit count is less than or equal to the threshold in step S61, the flow shifts to step S55.

As described above, the semiconductor memory device according to the fourth embodiment includes the management information page 122. The management information page 122 stores the erase/write flag which is set in accordance with whether it stores random data or is in the erased state. The management information page 122 is in the erased state in the early stage after manufacture of the semiconductor memory device 1, and in accordance with this the erase/write flag in the register is clear, and hence writing to the confidential information block 121 is permitted. Random data is then written in the management information page 122, followed by the shipment of the semiconductor memory device 1. At this stage, even if the management information page 122 is accessed, it stores random data, and hence the value indicative of prohibition is set in the erase/write flag storing register. In other words, rewriting of confidential information is impossible. Thus, a mechanism to prevent rewriting of confidential information is presented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device, comprising:
a memory which comprises an area accessible from outside and a confidential information area storing confidential information and a flag that is settable;
a controller which reads the flag from the confidential information area when instructed to erase data at an address within the confidential information area, determines whether the flag is set, erases data in the confidential information area when the flag is clear, and abandons a process requested by the erase instruction when the flag is set; and
an authenticator which uses data in the confidential information area to execute an operation for authentication, wherein
the memory comprises an information storage area including pages storing data and a management information area displaying one-bit information for the management information for the pages with n-bit random data, n being a natural number, when the one-bit information is valid; and
the controller determines whether random data is stored in the management information area, and determines that a corresponding bit of the management information is valid when random data is stored.

2. The device of claim 1, wherein the memory includes memory cells to which data can be written when the memory cells are in a data erased state.

3. The device of claim 1, wherein the flag includes bits, and the flag when set includes a specific bit string.

4. The device of claim 3, wherein the set flag includes the specific bit string and a complementary bit string including bits complementary to respective bits in the specific bit string.

5. The device of claim 1, wherein the memory generates a dummy busy when a data erase on the confidential information area is requested.

6. The device of claim 1, wherein the confidential information area stores dummy data when the memory is used for uses other than an application with an authentication function.

7. The device of claim 1, wherein the memory is configured to store two bits or more in one cell, and one cell stores one bit in the confidential information area.

8. The device of claim 1, wherein the controller reads the flag from the memory when instructed to write data in the confidential information area, determines whether the flag is set, writes data in the confidential information area when the flag is clear, and abandons a process requested by the write instruction when the flag is set.

9. The device of claim 1, wherein:
the management information area includes the flag,
the flag is displayed with n-bit random data,
the controller sets a valid value in a register of the controller when the management information area stores random data, and
the controller refuses at least one of erase and writing to the confidential information area when a valid value is set in the register.

10. The device of claim 1, wherein the management information area is associated with a set of pages in the information storage area, and stores management information for each of the associated pages.

11. A semiconductor memory device, comprising:
a memory which comprises an area accessible from outside and a confidential information area storing confidential information and a flag that is settable;
a controller which reads the flag from the confidential information area when instructed to erase or write data at an address within the confidential information area, determines whether the flag is set, erases or writes data in the confidential information area when the flag is clear, and abandons a process requested by the erase or write instruction when the flag is set; and
an authenticator which uses data in the confidential information area to execute an operation for authentication, wherein
the memory comprises an information storage area including pages storing data and a management information area displaying one-bit information for the management information for the pages with n-bit random data, n being a natural number, when the one-bit information is valid; and
the controller determines whether random data is stored in the management information area, and determines that a corresponding bit of the management information is valid when random data is stored.

12. The device of claim 11, wherein the memory includes memory cells to which data can be written when the memory cells are in a data erased state.

13. The device of claim 11, wherein the flag includes bits, and the flag when set includes a specific bit string.

14. The device of claim 13, wherein the set flag includes the specific bit string and a complementary bit string including bits complementary to respective bits in the specific bit string.

15. The device of claim 11, wherein the memory generates a dummy busy when a data erase on the confidential information area is requested.

16. The device of claim 11, wherein the confidential information area stores dummy data when the memory is used for uses other than an application with an authentication function.

17. The device of claim 11, wherein the memory is configured to store two bits or more in one cell, and one cell stores one bit in the confidential information area.

18. The device of claim 11, wherein:
the management information area includes the flag,
the flag is displayed with n-bit random data,
the controller sets a valid value in a register of the controller when the management information area stores random data, and
the controller refuses at least one of erase and writing to the confidential information area when a valid value is set in the register.

19. The device of claim 11, wherein the management information area is associated with a set of pages in the information storage area, and stores management information for each of the associated pages.

* * * * *